(12) United States Patent
Faivre et al.

(10) Patent No.: US 10,570,581 B2
(45) Date of Patent: Feb. 25, 2020

(54) LATCHING ARRANGEMENT FOR COUPLING A FRONT LOADER TO A WORK VEHICLE

(71) Applicant: Deere & Company, Moline, IL (US)

(72) Inventors: Damien Faivre, Apremont (FR); Diego Villarreal, Monterrey (MX)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/996,278

(22) Filed: Jun. 1, 2018

(65) Prior Publication Data
US 2019/0368156 A1     Dec. 5, 2019

(51) Int. Cl.
E02F 3/36        (2006.01)
E02F 9/26        (2006.01)

(52) U.S. Cl.
CPC .............. *E02F 3/3695* (2013.01); *E02F 9/26* (2013.01)

(58) Field of Classification Search
CPC .................................. E02F 3/3695; E02F 9/26
See application file for complete search history.

(56) References Cited

U.S. PATENT DOCUMENTS 5,620,297 A * 4/1997 Mahaney ........... A01D 87/0076
                                                      172/275
9,226,438 B2   1/2016 Faivre
9,226,439 B2   1/2016 Faivre et al.
9,267,263 B2   2/2016 Bertrand et al.
9,342,093 B2   5/2016 Villarreal et al.
2007/0292254 A1 * 12/2007 Mailleux ............... E02F 3/6273
                                                      414/686
2015/0093227 A1   4/2015 Faivre
2015/0233084 A1 *  8/2015 Seljestad ............... E02F 3/3663
                                                      414/723

FOREIGN PATENT DOCUMENTS

DE        3630976 A1     3/1987
DE   102010039420 A1     2/2012
WO     2007137350 A1    12/2007

OTHER PUBLICATIONS

European Search Report issued in counterpart European Patent Application No. 19173386.4, dated Nov. 8, 2019, 9 pages.

* cited by examiner

*Primary Examiner* — Ronald P Jarrett
(74) *Attorney, Agent, or Firm* — Tucker Ellis LLP

(57) ABSTRACT

A front loader includes a mast, and a mounting bracket that defines a channel configured to receive a mounting frame of a work vehicle. The front loader includes a latch disposed within the channel and pivotally coupled to the mounting bracket, and the latch is pivotable between a first, latched position configured to couple the mast to the mounting frame, and a second, unlatched position. The front loader includes a latching lever disposed within the channel and coupled to the latch. The latching lever is configured to move the latch between the first, latched position and the second, unlatched position based on a position of the mounting frame. The front loader includes an indicator lever coupled to the latch. The indicator lever is movable by the latch to indicate whether the latch is in the first, latched position or the second, unlatched position.

18 Claims, 9 Drawing Sheets

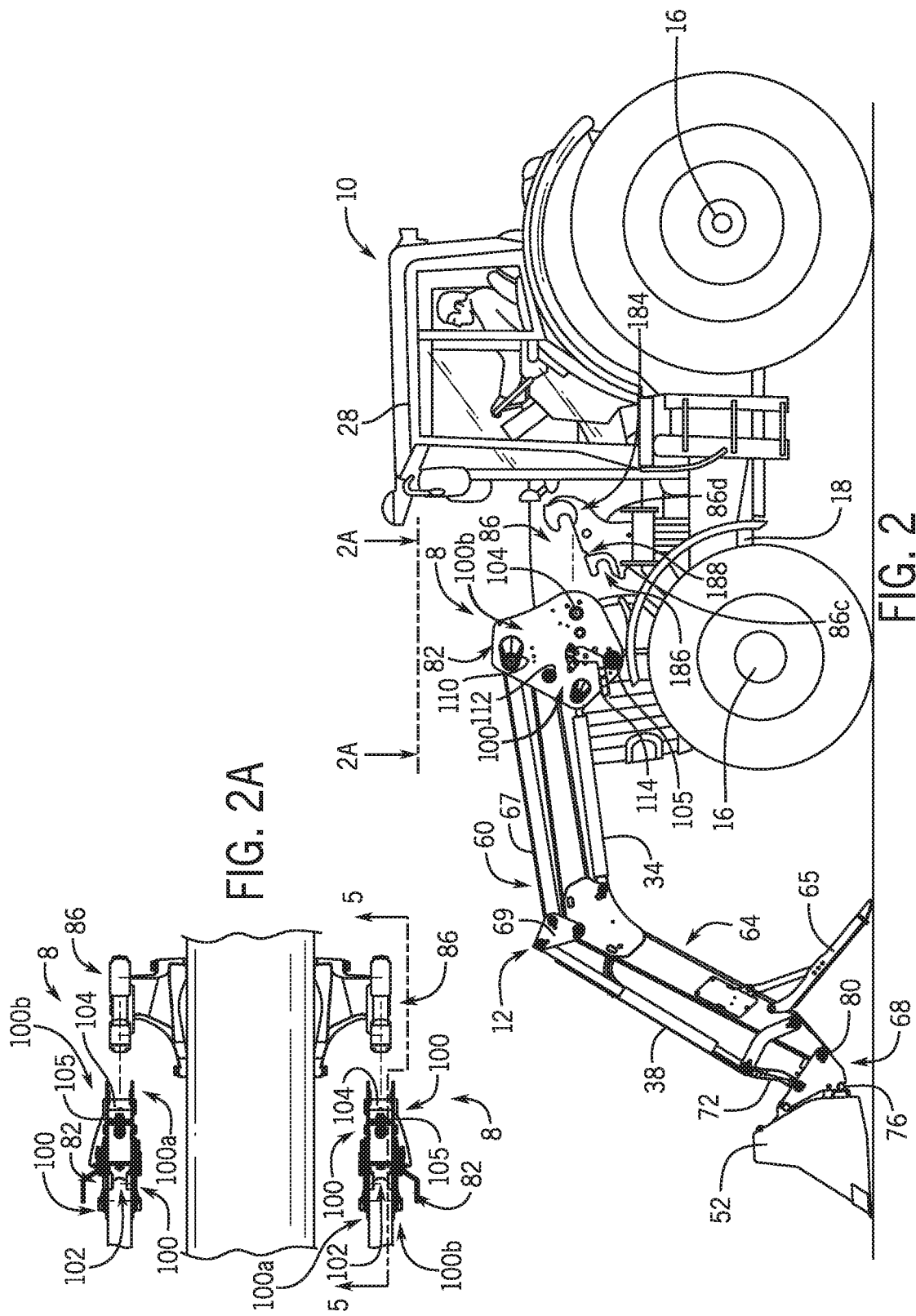

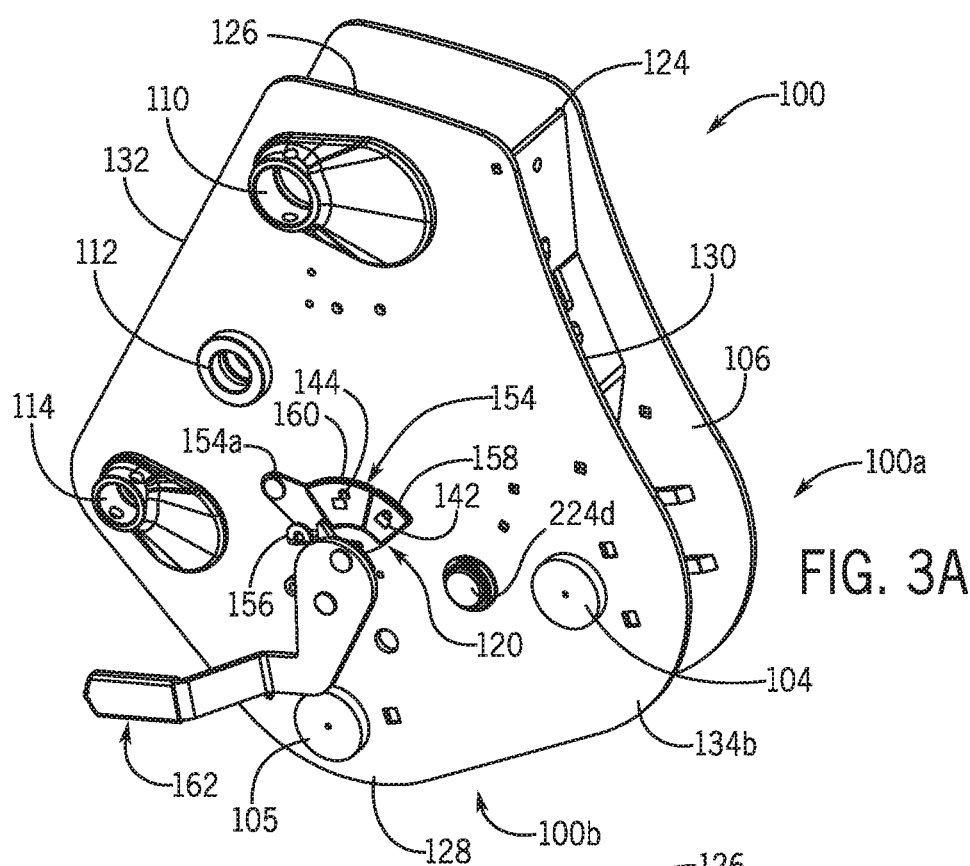
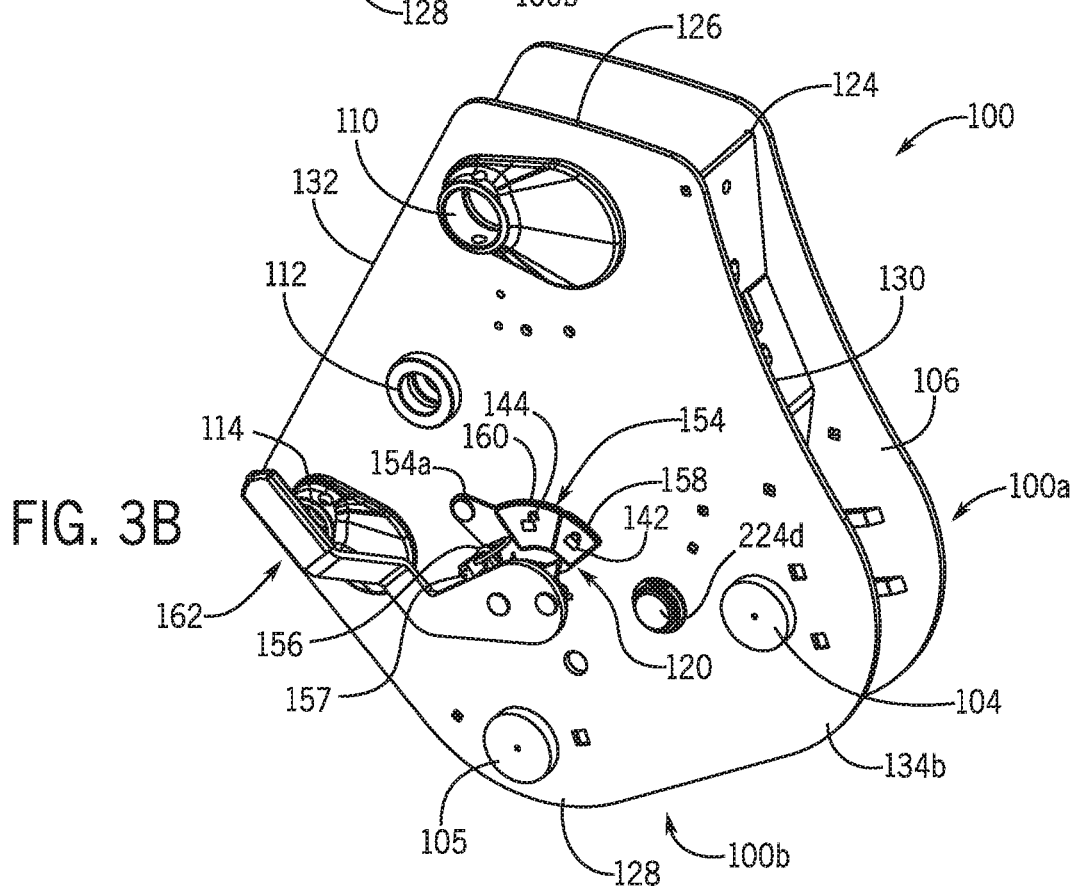

LATCHING ARRANGEMENT FOR COUPLING A FRONT LOADER TO A WORK VEHICLE

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles, and to a latching arrangement for coupling a front loader to a work vehicle.

BACKGROUND OF THE DISCLOSURE

In the agriculture, construction and forestry industries, various work machines, such as front loaders, may be utilized in lifting and moving various materials. In certain examples, a front loader may include a bucket pivotally coupled by a loader arms to the vehicle chassis. One or more hydraulic cylinders move the loader arms and/or the bucket to move the bucket between positions relative to the chassis to lift and move materials.

Generally, the front loader is reversibly or removably coupled to the work vehicle, which enables other work implements to be used with the work vehicle. Due to the nature of the front loader, in certain instances, an operator may not be able to tell whether or not the front loader is fully latched or secured to the work vehicle. This may result in the operator needing to leave the cab of the work vehicle to determine whether or not the front loader is latched to the work vehicle. The repeated trips of the operator from the work vehicle to the front loader increase a cycle time of the front loader, and reduce productivity. In addition, the repeated trips are inconvenient for the operator.

SUMMARY OF THE DISCLOSURE

The disclosure provides a latching arrangement for a work vehicle that enables an operator to easily detect that the front loader is coupled to the work vehicle without leaving the work vehicle.

In one aspect, the disclosure provides a front loader. The front loader includes a mast, and a mounting bracket that defines a channel configured to receive a mounting frame of a work vehicle. The front loader includes a latch disposed within the channel and pivotally coupled to the mounting bracket, and the latch is pivotable between a first, latched position configured to couple the mast to the mounting frame, and a second, unlatched position. The front loader includes a latching lever disposed within the channel and coupled to the latch. The latching lever is configured to move the latch between the first, latched position and the second, unlatched position based on a position of the mounting frame. The front loader includes an indicator lever coupled to the latch. The indicator lever is movable by the latch to indicate whether the latch is in the first, latched position or the second, unlatched position.

In another aspect, the disclosure provides a work vehicle having a mounting frame for coupling to a mast of a front loader. The mast includes a pair of mounting brackets that cooperate to define a channel configured to receive the mounting frame. One mounting bracket of the pair of mounting brackets includes a gauge. The mast includes a latch disposed within the channel and pivotally coupled to the pair of mounting brackets. The latch is pivotable between a first, latched position configured to couple the mast to the mounting frame, and a second, unlatched position. The mast includes a latching lever disposed within the channel and coupled to the latch. The latching lever is configured to move the latch between the first, latched position and the second, unlatched position based on a position of the mounting frame. The mast includes an indicator lever coupled to the latch. The indicator lever is movable by the latch and cooperates with the gauge to indicate whether the latch is in the first, latched position or the second, unlatched position.

In another aspect, a work vehicle is provided. The work vehicle includes a mounting frame having a connection point and a removable front loader having a mast. The work vehicle includes a latching arrangement. The latching arrangement includes a pair of mounting brackets that cooperate to define a channel configured to receive the mounting frame. The latching arrangement includes a mast connection member coupled between the pair of mounting brackets that is configured to couple to the connection point. The latching arrangement also includes a latch disposed within the channel and pivotally coupled to the pair of mounting brackets. The latch is pivotable between a first, latched position configured to couple the mast to the mounting frame, and a second, unlatched position. The latching arrangement includes a latching lever disposed within the channel and coupled to the latch, the latching lever configured to move the latch between the first, latched position and the second, unlatched position. The latching arrangement includes an indicator lever coupled to the latch. The indicator lever is movable by the latch to indicate whether the latch is in the first, latched position or the second, unlatched position.

The details of one or more embodiments are set forth in the accompanying drawings and the description below. Other features and advantages will become apparent from the description, the drawings, and the claims.

BRIEF DESCRIPTION OF THE DRAWINGS

FIG. 2 is a side view of the tractor of FIG. 1, in which the front loader is uncoupled or unlatched from the tractor;

FIG. 2A is a top view of FIG. 2, which illustrates the front loader latching arrangement associated with each side of the tractor and the front loader;

FIG. 3A is a side view of a mast associated with the front loader latching arrangement, in which an unlatch lever and a latch system of the front loader latching arrangement are in a second, unlatched position;

FIG. 3B is a side view of the mast associated with the front loader latching arrangement, in which the unlatch lever and the latch system of the front loader latching arrangement are in a first, latched position;

Like reference symbols in the various drawings indicate like elements.

DETAILED DESCRIPTION

Figure 1:
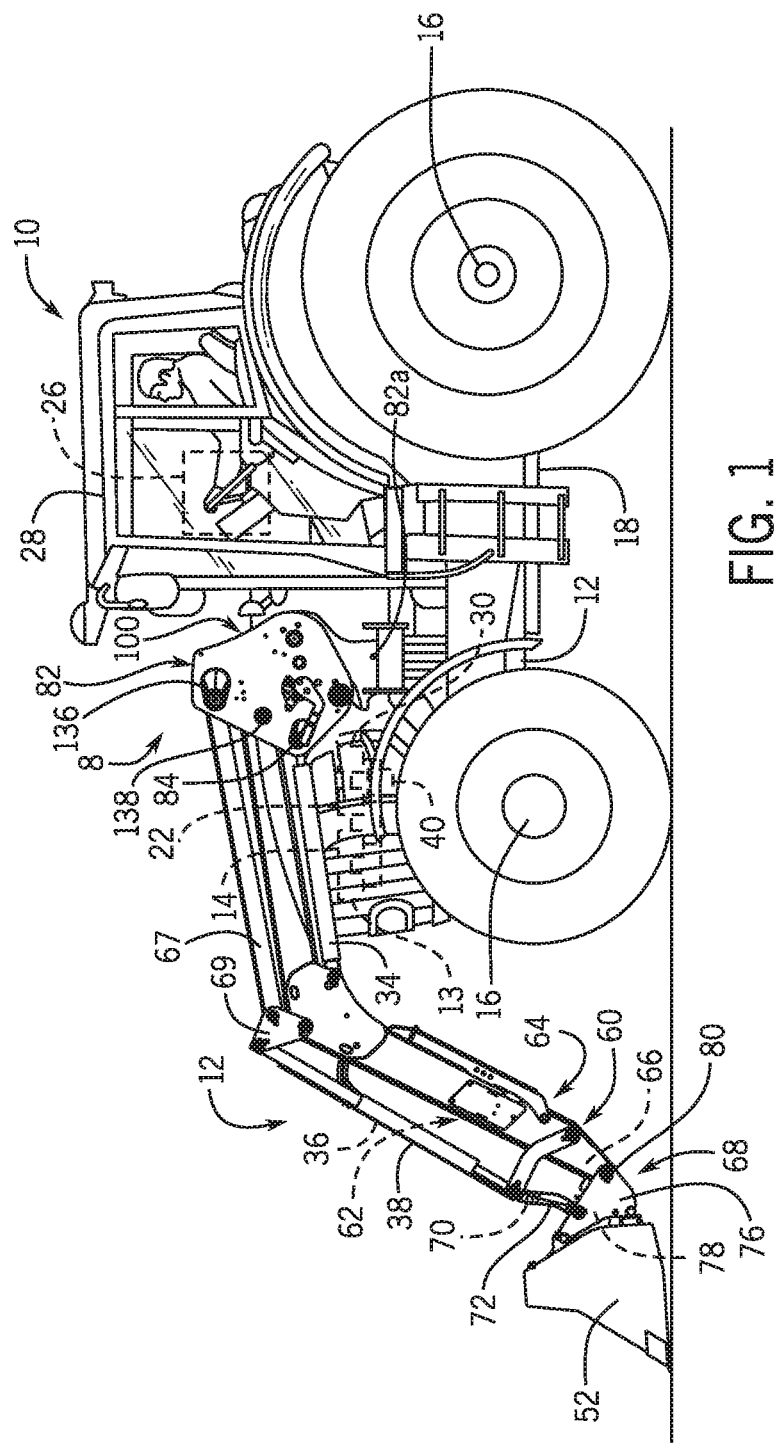
FIG. 1 is a side view of an example work vehicle in the form of an agricultural tractor in which the disclosed front loader latching arrangement may be used to couple a front loader to the tractor, and the front loader is coupled or latched to the tractor via the front loader latching arrangement in FIG. 1.

The following describes one or more example embodiments of the disclosed latching arrangement for coupling a front loader to a work vehicle, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Conventional front loader arrangements may not reliably indicate whether the front loader is securely coupled to the work vehicle. In these instances, operators are required to leave the cab of the work vehicle to inspect whether the front loader is securely coupled to the work vehicle. Each trip the operator makes from the work vehicle to inspect the connection of the front loader reduces cycle time and productivity of the work vehicle, and also reduces operator satisfaction.

This disclosure provides an alternative to the conventional front loader arrangements by providing a latching arrangement that enables an operator to easily and reliably detect from the cab of the work vehicle whether the front loader is coupled (latched) or uncoupled (unlatched). By being able to easily and reliably detect that the front loader is coupled or uncoupled without leaving the cab, cycle time and productivity are increased, along with operator satisfaction. The disclosed latching arrangement is reversible or enables the front loader to be connected to the work vehicle and disconnected from the work vehicle multiple times.

In one example, the disclosed front loader latching arrangement is associated with each side of the front loader and the work vehicle, such that there is a front loader latching arrangement for a left side of the front loader and work vehicle, and there is a front loader latching arrangement for the right side of the front loader and work vehicle. Each front loader latching arrangement is the same. Each front loader latching arrangement includes a mast associated with the front loader and a mounting frame associated with the work vehicle. The mast of the front loader includes a latch or latch system that removably or reversibly couples the front loader to the work vehicle. As used herein a "connection point" is a region or area defined on the mounting frame that is an attachment location for the mast of the front loader, and is not limited to a point in space or point contact. As used herein a "load point" is a region or area defined on the mounting frame that is a load transferring location for the mast of the front loader, and is not limited to a point in space or point contact.

In another example, the latch system includes a latch body and a latching lever that is coupled to the latch body. The latch body and the latching lever are pivotable about a pivot pin that is coupled between a pair of mounting brackets associated with the mast. The latching lever is biased by a biasing member upward, or in a direction away from the mounting frame. The latch body is coupled to an unlatch lever by a shaft, such that a movement or rotation of the unlatch lever moves the latch body, and thus, the latch, from a first, latched position to a second, unlatched position. In one example, the latch body is coupled to the shaft by a cam, and a movement or rotation of the shaft causes the latch body to follow the cam to move the latch body into the respective one of the first, latched position or the second, unlatched position. The shaft is also coupled to an indicator lever, such that a movement of the shaft causes a corresponding movement of the indicator lever. The indicator lever extends outwardly away from the shaft along one of the mounting brackets of the mast and cooperates with a first gauge to indicate or display a position of the latch body. The indicator lever and the first gauge are positioned on the mast of the front loader latching arrangement to be visible by the operator from within the cab, such that the operator does not need to leave the cab to visually inspect whether the front loader is latched or unlatched from the tractor. This improves productivity of the front loader, and also improves operator satisfaction. In addition, the unlatch lever cooperates with a second gauge to also indicate the position of the latch body, and thus, the latch as in the first, latched position or the second, unlatched position. In one example, the unlatch lever itself provides a visual indicator of the position of the latch body, as the unlatch lever rotates about 42 to about 52 degrees from the first, latched position to the second, unlatched position. The large range of motion of the unlatch lever provides a further visual indicator as to whether the front loader is latched to the work vehicle.

The following describes an example front loader latching arrangement for coupling a front loader to a work vehicle. The front loader latching arrangement may be utilized with various machines or work vehicles, including tractors and other machines for lifting and moving various materials in the agricultural and construction industries. Referring to FIGS. 1 and 2, in some embodiments, a front loader latching arrangement 8 may be used with a tractor 10 to couple a front loader 12 to the tractor 10. It will be understood that the implementation of the front loader latching arrangement 8 with the tractor 10 is presented as an example only. In this regard, the disclosed front loader latching arrangement 8 may be implemented with a front loader removably coupled to a work vehicle, such as a compact utility tractor. Other work vehicles, such as those used in the construction industry, may benefit from the disclosed front loader latching arrangement 8 as well.

Generally, the tractor 10 includes a source of propulsion, such as an engine 13 that supplies power to a transmission 14. In one example, the engine 13 is an internal combustion engine, such as a diesel engine, that is controlled by an engine control module. The transmission 14 transfers power from the engine 13 to a suitable driveline coupled to one or more driven wheels 16 of the tractor 10 to enable the tractor 10 to move. The engine 13, the transmission 14 and the rest of the driveline are supported by a vehicle chassis 18, which is supported off the ground by the wheels 16. As is known to one skilled in the art, the transmission 14 can include a suitable gear transmission, which can be operated in a variety of ranges containing one or more gears, including, but not limited to a park range, a neutral range, a reverse range, a drive range, a low range, a high range, etc. The transmission 14 may be controlled by a transmission control module, which is, along with the engine control module, in communication with a master controller 22 (or group of controllers).

The controller 22 may control various aspects of the operation of the tractor 10 and may be configured as a computing device with associated processor devices and memory architectures, as a hard-wired computing circuit (or circuits), as a programmable circuit, as a hydraulic, electrical or electro-hydraulic controller, or otherwise. As such, the controller 22 may be configured to execute various computational and control functionality with respect to the tractor 10 (or other machinery). In some embodiments, the controller 22 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 22 (or a portion thereof) may be configured as an assembly of hydraulic components (e.g., valves, flow lines, pistons and cylinders, and so on), such that control of various devices (e.g., pumps or motors) may be effected with, and based upon, hydraulic, mechanical, or other signals and movements.

The controller 22 may be in electronic, hydraulic, mechanical, or other communication with various other systems or devices of the tractor 10 (or other machinery), including the front loader 12. For example, the controller 22 may be in electronic or hydraulic communication with various actuators, sensors, and other devices within (or outside of) the tractor 10, including various devices associated with a hydraulic system of the tractor 10 and a hydraulic system of the front loader 12. The controller 22 may communicate with other systems or devices (including other controllers) in various known ways, including via a CAN bus (not shown) of the tractor 10, via wireless or hydraulic communication means, or otherwise. An example location for the controller 22 is depicted in FIG. 1. It will be understood, however, that other locations are possible including other locations on the tractor 10, or various remote locations. In some embodiments, the controller 22 may be configured to receive input commands and to interface with an operator via a human-machine interface 26, which may be disposed inside a cab 28 of the tractor 10 for easy access by the operator. The human-machine interface 26 is in communication with the controller 22 over a suitable communication architecture, such as a CAN bus. The human-machine interface 26 may be configured in a variety of ways and may include one or more joysticks, various switches or levers, a steering wheel, one or more buttons, a touchscreen interface that may be overlaid on a display, a keyboard, a speaker, a microphone associated with a speech recognition system, or various other human-machine interface devices.

The tractor 10 also has a hydraulic system that includes one or more pumps and accumulators (designated generally by reference number 30), which may be driven by the engine 13 of the tractor 10. Flow from the pumps 30 may be routed through various control valves and various conduits (e.g., flexible hoses) to drive various hydraulic cylinders, such as hydraulic cylinders 34, 36, 38 associated with the front loader 12, shown in FIG. 1. Flow from the pumps (and accumulators) 30 may also power various other components of the tractor 10. The flow from the pumps 30 may be controlled in various ways (e.g., through control of various electro-hydraulic control valves 40) to cause movement of the hydraulic cylinders 34, 36, 38, and thus, the front loader 12 relative to the tractor 10 when the front loader 12 is mounted on the tractor 10 through the front loader latching arrangement 8. In this way, for example, movement of the front loader 12 between various positions relative to the chassis 18 of the tractor 10 may be implemented by various control signals to the pumps 30, control valves 40, and so on.

In the embodiment depicted, the front loader 12 includes a bucket 52 pivotally mounted to a boom assembly 60. The bucket 52 may comprise a conventional steel bucket. The boom assembly 60 includes a first loader arm 62 (on an opposite side of the front loader 12) and a second loader arm 64, which are interconnected via a cross-beam 66 to operate in parallel. The loader arms 62, 64 are each configured to be coupled to the chassis 18 via a mast 82 of the front loader latching arrangement 8, at one end, and are coupled at an opposite end to the bucket 52 via a carrier 68, which is pivoted via first and second (left and right) pivot linkages 70, 72. In the illustrated example, the carrier 68 comprises first and second (left and right) couplers 74, 76, connected by a cross-rod 78, that mount to the distal ends of the respective loader arms 62, 64 via coupling pins 80. Additional pins pivotally couple the pivot linkages 70, 72 between the loader arms 62, 64 and the respective first and second couplers 74, 76. The pivot linkages 70, 72 enable pivotal movement of the bucket 52 upon actuation of the hydraulic cylinders 36, 38. The loader arms 62, 64 also include a respective parking stand 65, which supports the respective loader arm 62, 64 when the front loader 12 is uncoupled or unattached from the tractor 10 (FIG. 2). In certain embodiments, the loader arms 62, 64 also include a respective reinforcing arm 67, which is coupled between the mast 82 and a linkage 69. The reinforcing arms 67 are coupled to the linkage 69 and provide support for the movement of one or more hydraulic cylinders 36, 38.

The hydraulic cylinders 34 may be actuated to raise and lower the boom assembly 60 relative to the tractor 10. In the illustrated example, the boom assembly 60 includes two hydraulic cylinders, namely the hydraulic cylinder 34 coupled between a mast 82 of the front loader 12 and the second loader arm 64 and a corresponding cylinder on the opposite side of the front loader 12 (not shown) coupled between the mast 82 and the first loader arm 62. It should be noted that the front loader 12 and/or tractor 10 may have any number of hydraulic cylinders, such as one, three, etc. Each of the hydraulic cylinders 34 includes an end coupled to the mast 82 (e.g., via a coupling pin 84) and an end mounted to the respective one of the first loader arm 62 and the second loader arm 64 (e.g., via another pin). Upon activation of the hydraulic cylinders 34, the boom assembly 60 may be moved between various positions to elevate the boom assembly 60, and thus the bucket 52, relative to the chassis 18 of the tractor 10.

The one or more hydraulic cylinders 36 are mounted to the first loader arm 62 and the first pivot linkage 70, and the one or more hydraulic cylinders 38 are mounted to the second loader arm 64 and the second pivot linkage 72. In the illustrated example, the front loader 12 includes a single hydraulic cylinder 36, 38 associated with a respective one of the first loader arm 62 and the second loader arm 64, respectively. Each of the hydraulic cylinders 36, 38 includes an end mounted to the linkage 69 (via another pin) of a respective one of the first loader arm 62 and the second loader arm 64 and an end mounted to the respective one of the first pivot linkage 70 and the second pivot linkage 72 (via another pin). Upon activation of the hydraulic cylinders 36, 38, the bucket 52 may be moved between various positions, namely to pivot the carrier 68, and thereby the bucket 52, relative to the boom assembly 60.

Thus, in the embodiment depicted, the bucket 52 is pivotable about the carrier 68 of the boom assembly 60 by the hydraulic cylinders 36, 38. As noted, in some embodiments, a different number or configuration of hydraulic cylinders or other actuators may be used. Accordingly, it will be understood that the configuration of the hydraulic system and the boom assembly 60 is presented as an example only. In this regard, in other contexts, a hoist boom (e.g. the boom assembly 60) may be generally viewed as a boom that is pivotally attached to a vehicle frame (via the front loader latching arrangement 8), and that is also pivotally attached to an end effector (e.g., the bucket 52). Similarly, the carrier 68 (e.g., the couplers 74, 76) may be generally viewed as a component effecting pivotal attachment of a bucket (e.g. the bucket 52) to a vehicle frame. In this light, a tilt actuator (e.g., the hydraulic cylinders 36, 38) may be generally viewed as an actuator for pivoting a receptacle with respect to a hoist boom, and the hoist actuator (e.g. the hydraulic cylinders 34) may be generally viewed as an actuator for pivoting a hoist boom with respect to a vehicle frame.

In certain applications, sensors (e.g., pressure, flow or other sensors) may be provided to observe various conditions associated with the tractor 10. For example, the sensors may include one or more pressure sensors that observe a pressure within the hydraulic circuit, such as a pressure associated with at least one of the pumps 30, the control valves 40 and/or one or more hydraulic cylinders 34, 36, 38 to observe a pressure within the hydraulic cylinders and generate sensor signals based thereon. In some cases, various sensors may be disposed on or near the carrier 68 and/or the bucket 52. For example, sensors (e.g. inertial measurement sensors) may be coupled on or near the bucket 52 to observe or measure parameters including the acceleration of the boom assembly 60 and/or the bucket 52 and generate sensor signals, which may indicate if the boom assembly 60 and/or the bucket 52 is accelerating or decelerating. In some embodiments, various sensors (e.g., angular position sensors) may be configured to detect the angular orientation of the bucket 52 relative to the boom assembly 60, or to detect the angular orientation of the boom assembly 60 relative to the chassis 18, and various other indicators of the current orientation or position of the bucket 52. For example, rotary angular positon sensors may be used or linear position or displacement sensors may be used to determine the length of the hydraulic cylinders 34, 36, 38 relative to the boom assembly 60.

The bucket 52 generally defines a receptacle for carrying various materials, such as dirt, rocks, wet dirt, sand, hay, etc. The bucket 52 is movable upon actuation of the hydraulic cylinders 36, 38 between a level position, a roll-back position and a dump position, along with various positions in between. In the level position, the bucket 52 can receive various materials. In the roll-back position, the bucket 52 is pivoted upward relative to the earth's surface or ground by the actuation of the hydraulic cylinders 36, 38 such that the bucket 52 may be loaded with and retain the various materials. In the dump position, the bucket 52 is pivoted downward relative to the earth's surface or ground by the actuation of the hydraulic cylinders 36, 38 such that the various materials may fall from the bucket 52 to substantially empty the bucket 52.

The front loader latching arrangement 8 reversibly or removably couples the front loader 12 to the tractor 10. Generally, with reference to FIG. 2A, the front loader 12 and the tractor 10 include two front loader latching arrangements 8, one for each side (e.g. left side, right side) of the front loader 12 and tractor 10. As the front loader latching arrangement 8 on the left side of the tractor 10 is the same as the front loader latching arrangement 8 on the right side of the tractor 10, the front loader latching arrangement 8 on the right side will be discussed in detail herein, with the understanding that the front loader latching arrangement 8 on the left side is the same.

Figure 5:
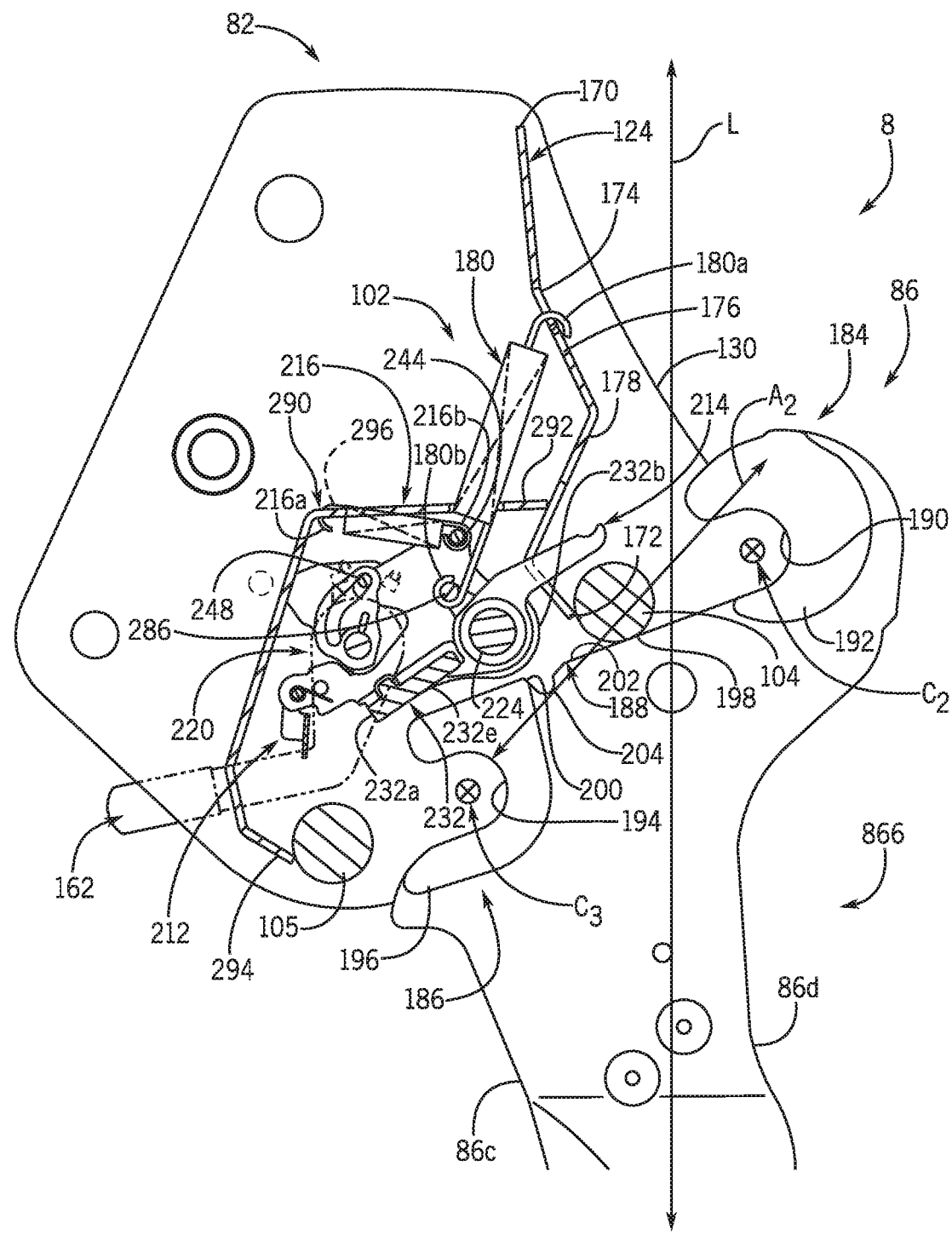
FIG. 5 is a cross-sectional detail view of the front loader latching arrangement, taken along line 5-5 of FIG. 2A, in which the latch system is in the second, unlatched position and a mounting frame of a right side of the tractor is spaced a distance apart from and uncoupled from the mast of a right side of the front loader.
Figure 8:
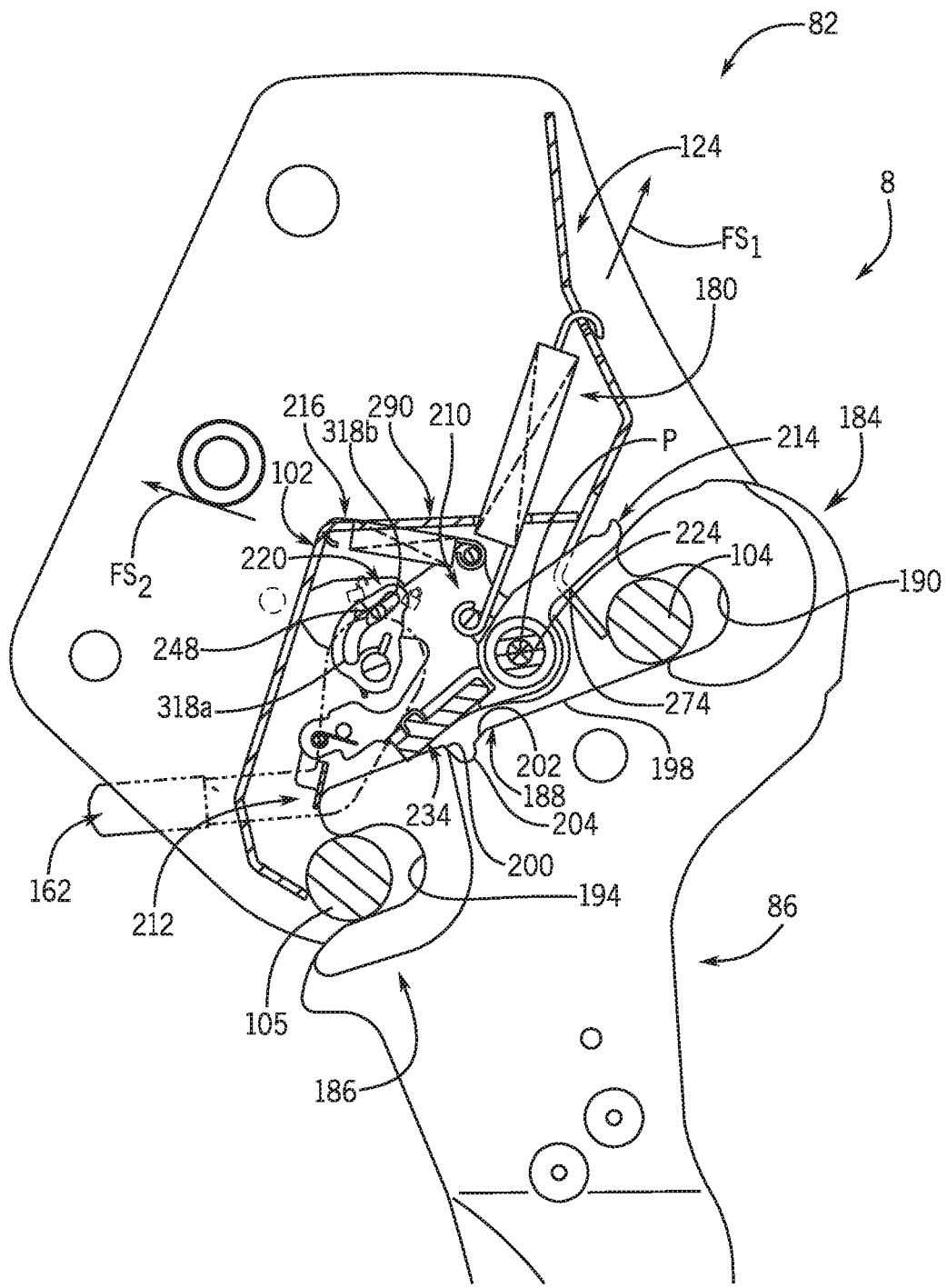
FIG. 8 is a cross-sectional detail view of the front loader latching arrangement, taken along the perspective of line 5-5 of FIG. 2A, in which the latch system is moving from the second, unlatched position toward the first, latched position based on contact between the mounting frame and the latching lever of the latch system.
Figure 9:
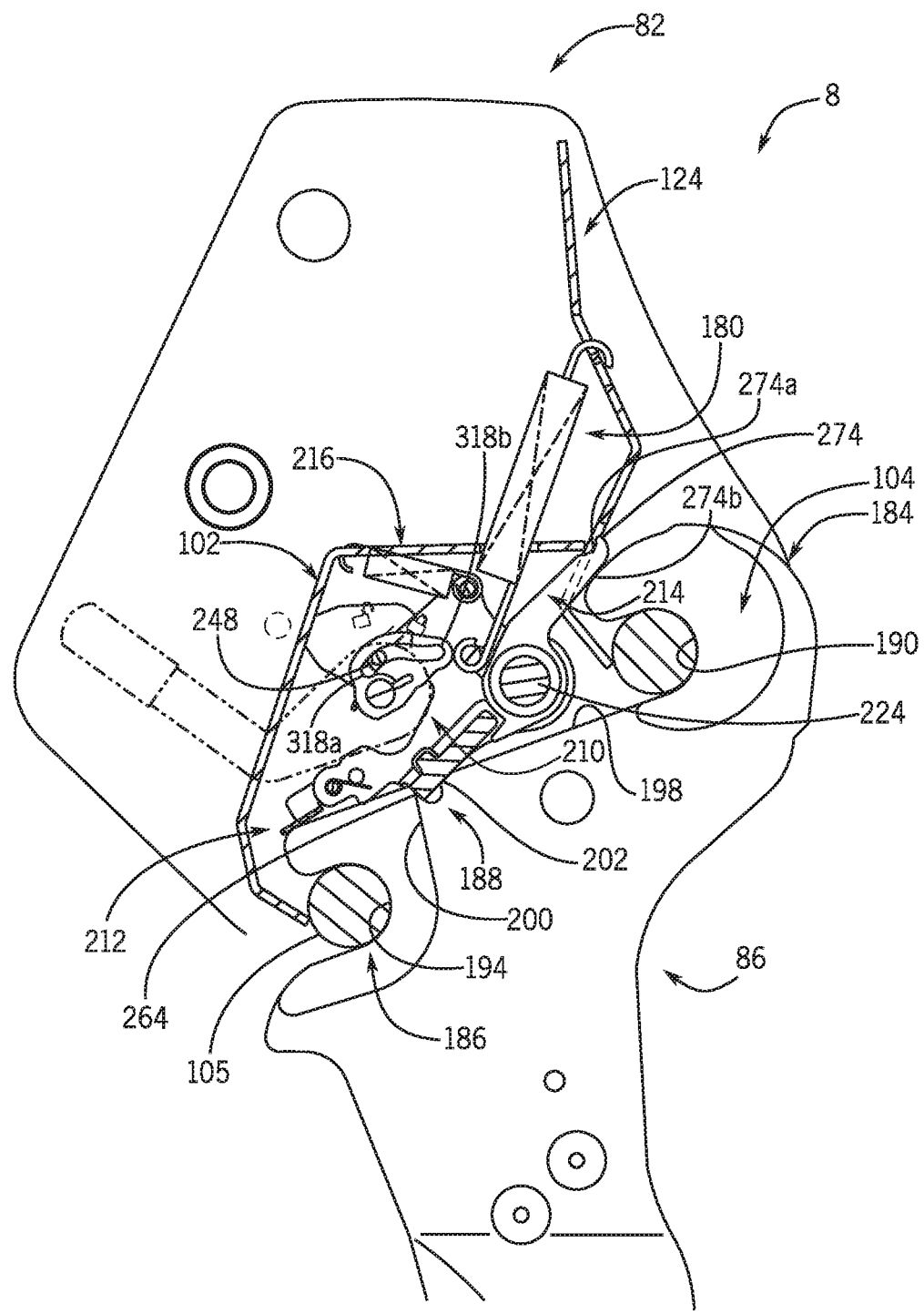
FIG. 9 is a cross-sectional detail view of the front loader latching arrangement, taken along the perspective of line 5-5 of FIG. 2A, in which the latch system is in the first, latched position to couple the mounting frame of the right side of the tractor to the mast of the right side of the front loader.

In one example, each front loader latching arrangement 8 includes the mast 82 of the front loader 12 and a mounting frame 86 coupled to the chassis 18 (FIG. 2). With reference also to FIGS. 2A, 3 and 5, the mast 82 includes a pair of mounting brackets 100 (FIG. 2A), a latch system 102 (FIG. 5), a first mast connector or first mast connection member 104 (FIG. 2A) and a second mast connector or second mast connection member 105 (FIG. 3A). The pair of mounting brackets 100 is mounted at a proximal end of the mast 82 of the front loader 12. FIGS. 5, 8 and 9 illustrate a respective combination of the mast 82 and mounting frame 86 at the right side of the front loader 12 and the tractor 10 in a detail view in a plurality of cross-sectional views to illustrate the coupling of the front loader 12 to the tractor 10 with the front loader latching arrangement 8.

Figure 4:
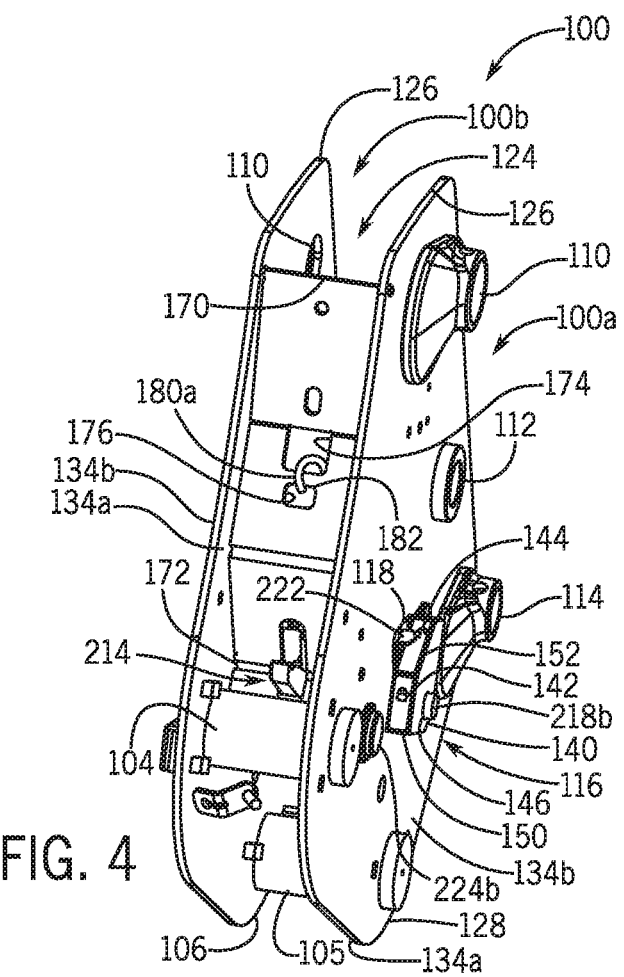
FIG. 4 is an end view of the mast associated with the front loader latching arrangement, in which the latch system of the front loader latching arrangement is in the second, unlatched position.

With reference to FIG. 2A, the pair of mounting brackets 100 cooperate to define a channel 106 that is configured to receive the mounting frame 86. Generally, each of the mounting brackets 100 are spaced apart from each other such that the channel 106 is defined between the pair of mounting brackets 100 and the mounting frame 86 may be received between the pair of mounting brackets 100. The mounting brackets 100 are composed of a metal or metal alloy, and are stamped, cast, forged, etc. With reference also to FIG. 3A, each of the mounting brackets 100 includes a first pin coupling bore 110, a second pin coupling bore 112 and a third pin coupling bore 114. In addition, one of the mounting brackets 100a includes a first indicator or first gauge 116 and an indicator slot 118 (FIG. 4). The other of the mounting brackets 100b includes a second indicator or second gauge 120 and an unlatching lever bore 122 (FIG. 3A). The mounting brackets 100 may be interconnected by at least one reinforcement panel 124. Each of the mounting brackets 100 also has a first end 126 opposite a second end 128, and a first side 130 opposite a second side 132. The mounting brackets 100 also include an interior surface 134a (FIG. 4) opposite an exterior surface 134b (FIG. 4).

With reference to FIG. 3A, first pin coupling bore 110 is defined through the mounting bracket 100a, 100b adjacent to or near the first end 126, and so as to be adjacent to or near the second side 132. The first pin coupling bore 110 receives a pin 136 (FIG. 1) to couple the reinforcing arm 67 (FIG. 1) to the mounting brackets 100a, 100b. The second pin coupling bore 112 is defined through the mounting bracket 100a, 100b so as to be between the first pin coupling bore 110 and the third pin coupling bore 114, and so as to be adjacent to or near the second side 132. The first pin coupling bore 110 receives a pin 138 (FIG. 1) to couple the end of the loader arm 64 (FIG. 1) to the mounting brackets 100a, 100b. The third pin coupling bore 114 is defined through the mounting brackets 100a, 100b adjacent to or near the second end 128, so as to be adjacent to or near the second side 132. The third pin coupling bore 114 receives the coupling pin 84 (FIG. 1) to couple the end of the hydraulic cylinder 34 (FIG. 1) to the mounting brackets 100a, 100b. Each of the first pin coupling bore 110, the second pin coupling bore 112 and the third pin coupling bore 114 may be defined in the mounting bracket 100a, 100b by stamping, machining, etc.

Figure 4A:
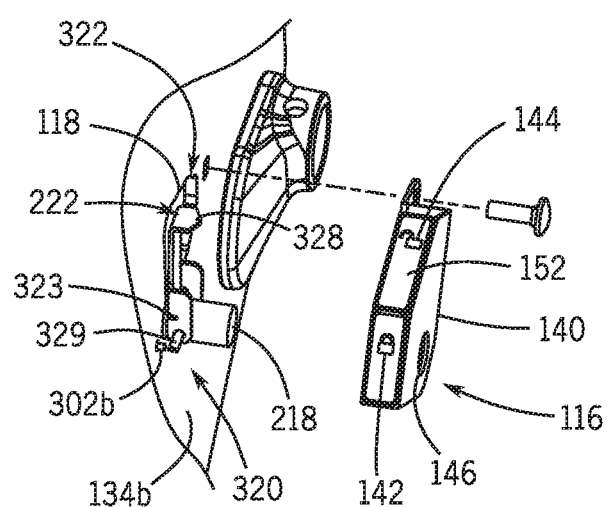
FIG. 4A is a partially exploded view that illustrates a first gauge of the front loader latching arrangement exploded from one of a pair of mounting brackets of the mast.

With reference to FIG. 4, in this example, the first gauge 116 is defined on the mounting bracket 100a. The mounting bracket 100a is generally positioned interior to the mounting bracket 100b on the mast 82. Stated another way, the mounting bracket 100a faces the mounting bracket 100a of the opposing pair of mounting brackets 100 (FIG. 2A). By forming the first gauge 116 on the mounting bracket 100a, the first gauge 116 is viewable by the operator from the cab 28 (FIG. 2) of the tractor 10. The first gauge 116 indicates whether the mast 82 of the front loader 12 (FIG. 2) is coupled or securely latched to the tractor 10 or whether the mast 82 of the front loader 12 (FIG. 2) is uncoupled or unlatched from the tractor 10. In one example, with reference to FIG. 4A, the first gauge 116 includes a gauge body 140, a first indicator symbol 142 and a second indicator symbol 144.

In one example, the gauge body 140 is substantially polygonal, and is coupled to the mounting bracket 100a so as to extend outward from the exterior surface 134b of the mounting bracket 100a (FIG. 4). The gauge body 140 may be composed of a metal or metal alloy, and may be cast, forged, stamped, etc. The gauge body 140 may be substantially hollow, and may define a gauge bore 146. The gauge bore 146 receives a portion of the latch system 102 and enables the latch system 102 to move relative to the gauge body 140. The gauge body 140 may be coupled to the mounting bracket 100a via any suitable technique, including, but not limited to, welding, adhesives, mechanical fasteners, press-fit, etc. The gauge body 140 also includes at least a first gauge surface 150 and a second gauge surface 152. The first gauge surface 150 is defined on a perimeter of the gauge body 140, so as to face toward the cab 28 of the tractor 10 when the mast 82 is coupled to the tractor 10. In one example, the first gauge surface 150 is substantially flat or planar, and receives the first indicator symbol 142. The second gauge surface 152 is defined on a perimeter of the gauge body 140 and also faces toward the cab 28 of the tractor 10 when the mast 82 is coupled to the tractor 10. The second gauge surface 152 is defined on the perimeter of the gauge body 140 so as to be adjacent to the first gauge surface 150. In one example, the second gauge surface 152 substantially flat or planar, and receives the second indicator symbol 144. The first gauge surface 150 and the second gauge surface 152 may be color coded, through an application of a paint, sticker, etching, etc. For example, the first gauge surface 150 may be colored yellow and the second gauge surface 152 may be colored red. Generally, each of the first gauge surface 150 and the second gauge surface 152 are sized to enable a portion of the latch system 102 to be visible to the operator when positioned over a respective one of the first gauge surface 150 and the second gauge surface 152 to indicate the position of the latch system 102.

The first indicator symbol 142 graphically and/or textually indicates that the front loader 12 is coupled, latched or locked to the tractor 10. In one example, the first indicator symbol 142 is a graphical representation of a locked padlock; however, it will be understood that any suitable graphical representation, icon or text may be employed. In this example, the first indicator symbol 142 is a sticker, which is positioned on the first gauge surface 150. In other embodiments, the first indicator symbol 142 may be defined on the first gauge surface 150, via stamping, etching, machining, embossing, etc. It should be noted that in the example of stickers, the first indicator symbol 142 may be colored such that when the first indicator symbol 142 is positioned over the first gauge surface 150, the first gauge surface 150 is colored.

The second indicator symbol 144 graphically and/or textually indicates that the front loader 12 is uncoupled, unlatched or unlocked to the tractor 10. In one example, the second indicator symbol 144 is a graphical representation of an unlocked padlock; however, it will be understood that any suitable graphical representation, icon or text may be employed. In this example, the second indicator symbol 144 is a sticker, which is positioned on the second gauge surface 152. In other embodiments, the second indicator symbol 144 may be defined on the second gauge surface 152, via stamping, etching, machining, embossing, etc. It should be noted that in the example of stickers, the second indicator symbol 144 may be colored such that when the second indicator symbol 144 is positioned over the second gauge surface 152, the second gauge surface 152 is colored. Moreover, a continuous sticker (having the first indicator symbol 142 and the second indicator symbol 144) may be applied to both the first gauge surface 150 and the second gauge surface 152.

With continued reference to FIG. 4, the indicator slot 118 is defined to enable the portion of the latch system 102 to be positioned over the respective one of the first gauge surface 150 and the second gauge surface 152. Thus, the indicator slot 118 is in communication with the gauge body 140. The indicator slot 118 is defined through the interior surface 134a and the exterior surface 134b of the mounting bracket 100a and enables the portion of the latch system 102 to pass through the mounting bracket 100a to communicate the status of the front loader 12 as latched (first gauge surface 150) or unlatched (second gauge surface 152).

With reference back to FIG. 3A, the mounting bracket 100b includes the second gauge 120. The second gauge 120 cooperates with the latch system 102 to indicate a position of the latch system 102 such that the operator may manually move the latch system 102 to the unlatched position to uncouple the front loader 12 from the tractor 10 (FIG. 1). In one example, the second gauge 120 is defined on a plate 154, which is coupled to the exterior surface 134b of the mounting bracket 100b. In one example, the plate 154 includes a bore 154a that receives a mechanical fastener, such as a bolt, to couple the plate 154 to the mounting bracket 100b. In certain embodiments, the plate 154 may also define a lock pin bore 156. The lock pin bore 156 receives a lock pin 157, which retains the latch system 102 in the latched position to inhibit an inadvertent unlatching of the front loader 12 from the tractor 10 (FIG. 1). The plate 154 also defines a third gauge surface 158 and a fourth gauge surface 160.

The third gauge surface 158 is defined on the plate 154 so as to be positioned toward the first end 126 of the mounting bracket 100b on the plate 154. In one example, the third gauge surface 158 is substantially flat or planar, and receives the first indicator symbol 142. The fourth gauge surface 160 is defined on the plate 154 so as to be positioned toward the second end 132 of the mounting bracket 100b on the plate 154. The fourth gauge surface 160 is defined on the plate 154 so as to be adjacent to the third gauge surface 158. In one example, the fourth gauge surface 160 is substantially flat or planar, and receives the second indicator symbol 144. The third gauge surface 158 and the fourth gauge surface 160 may be color coded, through an application of a paint, sticker, etching, etc. For example, the third gauge surface 158 may be colored yellow and the fourth gauge surface 160 may be colored red. Generally, each of the third gauge surface 158 and the fourth gauge surface 160 are sized to enable a portion of the latch system 102 to be visible to the operator when positioned over a respective one of the third gauge surface 158 and the fourth gauge surface 160 to indicate the position of the latch system 102.

The mounting bracket 100b also defines the unlatching lever bore 122. The unlatching lever bore 122 receives a portion of the latch system 102 to enable the portion of the latch system 102 to move relative to the mounting bracket 100b. As will be discussed, in one example, the unlatching lever bore 122 receives a portion of an unlatch lever 162 associated with the latch system 102. The unlatch lever 162 is movable by the operator to move the front loader 12 from the latched position to the unlatched position to uncouple the front loader 12 from the tractor 10 (FIG. 1). The mounting brackets 100a, 100b may also define corresponding bores that enable a portion of the latch system 102 to be coupled to each of the mounting brackets 100a, 100b.

With reference to FIG. 4, the reinforcing panel 124 extends through the channel 106 to interconnect the mounting bracket 100a and the mounting bracket 100b. The reinforcing panel 124 is composed of a metal or a metal alloy, and is stamped, cast, forged, machined, etc. The reinforcing panel 124 is coupled to the mounting brackets 100a, 100b via welding, however, any technique may be employed. In one example, the at least one reinforcing panel 124 includes a first panel end 170, a second panel end 172 opposite the first panel end 170, a first retaining slot 174, a second retaining slot 176 and a clearance slot 178. The first panel end 170 is coupled within the channel 106 proximate the first end 126 of the mounting brackets 100a, 100b. The second panel end 172 extends from the first panel end 170 toward the first mast connection member 104. The second panel end 172 may be recessed relative to the first surface 130 to provide clearance for a portion of the mounting frame 86 to be received within the channel 106. The first retaining slot 174 is defined through the reinforcing panel 124 between the first panel end 170 and the second retaining slot 176. The second retaining slot 176 is defined through the reinforcing panel 124 so as to be proximate the first retaining slot 174. The first retaining slot 174 and the second retaining slot 176 cooperate to receive and retain a first spring end 180a of a first biasing member or first spring 180 (FIG. 5) of the latch system 102 on the reinforcing panel 124. In one example, the first retaining slot 174 is separated from the second retaining slot 176 by a bar 182, to enable the first spring end 180a of the first spring 180 to be hooked about the bar 182 to couple the first spring 180 to the reinforcing panel 124. The clearance slot 178 is defined through the reinforcing panel 124 at the second panel end 172 and extends toward the first panel end 170. As will be discussed, the clearance slot 178 enables a movement of a portion of the latch system 102 relative to the mounting brackets 100a, 100b.

The first mast connection member 104 is fixedly coupled between each of the mounting brackets 100a, 100b. The first mast connection member 104 cooperates with the mounting frame 86 to rotate the mast 82 for the coupling of the mast 82 to the mounting frame 86. The first mast connection member 104 removably couples the mounting brackets 100a, 100b to a connection point on the mounting frame 86 when the front loader 12 is attached to the tractor 10 (FIG. 1). The first mast connection member 104 is composed of a metal or metal alloy, and is extruded, stamped, cast, forged, etc. The first mast connection member 104 has opposed ends, and each end of the first mast connection member 104 is coupled to a respective one of the mounting brackets 100a, 100b, via welding, for example. In one example, the first mast connection member 104 is shaped as a cylindrical pin. It should be noted, however, that the first mast connection member 104 may have any desired shape that corresponds with the mounting frame 86, and need not be cylindrical. As will be discussed, the first mast connection member 104 is received within a portion of the mounting frame 86 to hook the front loader 12 onto the portion of the mounting frame 86.

The second mast connection member 105 is fixedly coupled between each of the mounting brackets 100a, 100b. The second mast connection member 105 cooperates with the mounting frame 86 to rotate the mast 82 for the coupling of the mast 82 to the mounting frame 86. The second mast connection member 105 removably couples the mounting bracket 100a, 100b to a connection point on the mounting frame 86 when the front loader 12 is attached to the tractor 10 (FIG. 1). The second mast connection member 105 is composed of a metal or metal alloy, and is extruded, stamped, cast, forged, etc. The second mast connection member 105 has opposed ends, and each end of the second mast connection member 105 is coupled to a respective one of the mounting brackets 100a, 100b, via welding, for example. In one example, the second mast connection member 105 is shaped as a cylindrical pin. It should be noted, however, that the second mast connection member 105 may have any desired shape that corresponds with the mounting frame 86, and need not be cylindrical. As will be discussed, the second mast connection member 105 is received within a portion of the mounting frame 86 to hook the front loader 12 onto the portion of the mounting frame 86.

As will be discussed, the latch system 102 couples the mast 82 to the mounting frame 86. The mounting frame 86 cooperates with the mast 82 to couple the front loader 12 to the tractor 10. The mounting frame 86 is composed of a metal or metal alloy, and may be cast, forged, stamped, extruded, etc. The mounting frame 86 has a first frame end 86a that is fixedly coupled to the chassis 18 of the tractor 10 (FIG. 1), via welding, for example. Alternatively, the first frame end 86a may be integrally formed with the chassis 18. The mounting frame 86 has a second frame end 86b opposite the first frame end 86a. The second frame end 86b is received in the channel 106 defined between the mounting brackets 100 (FIG. 2A). With reference to FIG. 2, the mounting frame 86 also has a first side 86c and an opposite second side 86d. In one example, the second frame end 86b of the mounting frame 86 includes a first mounting frame connection point 184, a second mounting frame connection point 186 and a mounting frame load point 188 for coupling the mast 82 to the mounting frame 86.

With reference to FIG. 5, the first mounting frame connection point 184 is spaced a distance apart from the second mounting frame connection point 186 along the second frame end 86b. In this example, the first mounting frame connection point 184 is defined at the second side 86d of the mounting frame 86. In one example, the first mounting frame connection point 184 is a hook, which defines a concave recess 190. The concave recess 190 has a central axis C2. The first mounting frame connection point 184 may be formed with a pair of substantially C-shaped reinforcements 192, which may be coupled to opposed sides of the mounting frame 86 at the first mounting frame connection point 184. The pair of reinforcements 192 may be composed of metal or metal alloy, and may be integrally formed with the mounting frame 86. In other embodiments, the pair of reinforcements 192 may be fixedly coupled to the mounting frame 86 at the first mounting frame connection point 184 via welding, for example. The pair of reinforcements 192 provide strength to the first mounting frame connection point 184.

The second mounting frame connection point 186 is defined at the first side 86c of the mounting frame 86. In one example, the second mounting frame connection point 186 is a second hook, which defines a second concave recess 194. Thus, the first mounting frame connection point 184 and the second mounting frame connection point 186 are respective first and second open-sided recesses that are each sized to receive the respective first mast connection member 104 and the second mast connection member 105. The second concave recess 194 has a central axis C3, which is configured to receive the second mast connection member 105. The second mounting frame connection point 186 may be formed with a second pair of substantially C-shaped reinforcements 196, which may be coupled to opposed sides of the mounting frame 86 at the second mounting frame connection point 186. The second pair of reinforcements 196 may be composed of metal or metal alloy, and may be integrally formed with the mounting frame 86. In other embodiments, the second pair of reinforcements 196 may be fixedly coupled to the mounting frame 86 at the second mounting frame connection point 186 via welding, for example. The second pair of reinforcements 196 provide strength to the second mounting frame connection point 186.

The mounting frame load point 188 is defined on an interface surface 198 that extends between the first mounting frame connection point 184 and the second mounting frame connection point 186 at the second frame end 86b. In one example, the mounting frame load point 188 is a multi-sided notch, which is defined into the interface surface 198 proximate the second pair of reinforcements 196. In this example, the mounting frame load point 188 includes a first surface 200, a second surface 202 and a relief 204. The first surface 200 is at an angle to the second surface 202. The first surface 200 is defined proximate the second pair of reinforcements 196 and extends along an axis A1. The axis A1 is oblique to or intersects a longitudinal axis L of the mounting frame 86. The second surface 202 is spaced apart from the first surface 200 by the relief 204. The second surface 202 extends along an axis A2, which is oblique to or intersects the axis A1 and the longitudinal axis L. The relief 204 is substantially concave, and connects the first surface 200 to the second surface 202. The relief 204 is sized such that a portion of the latch system 102 is received within the relief 204.

Figure 6:
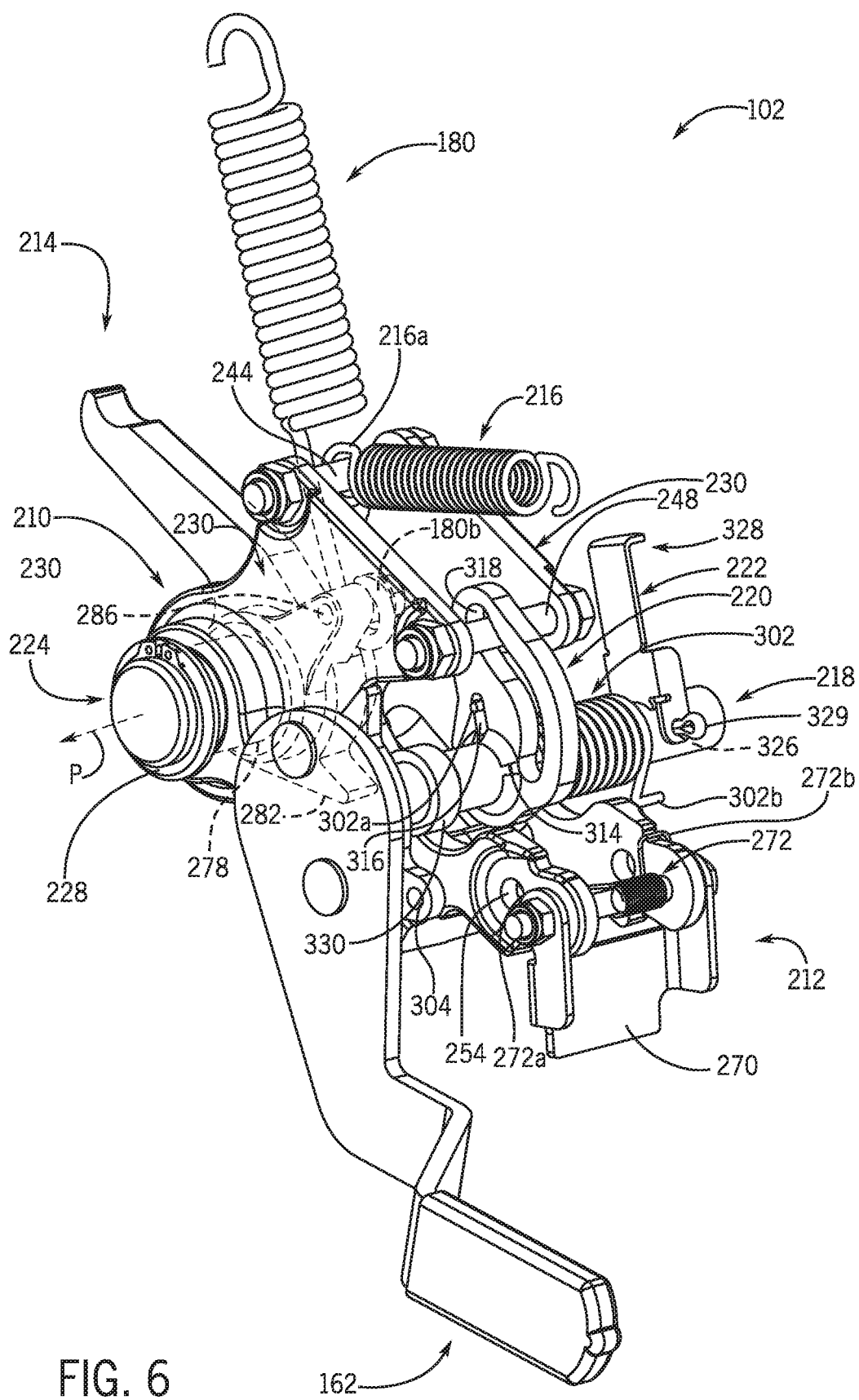
FIG. 6 is a perspective view of the latch system of the front loader latching arrangement.

The latch system 102 reversibly or removably couples the front loader 12 to the tractor 10 (FIG. 1). With reference to FIG. 6, in one example, the latch system 102 includes a latch body 210, a support hinge 212, a latch positioning lever 214, the first spring 180 and a second biasing member or second spring 216. The latch system 102 is also coupled to a portion of the unlatch lever 162 to enable the latch system 102 to be manually moved, by the operator, to the unlatched position. As will be discussed, the latch system 102 is coupled to a shaft 218 that is coupled to the unlatch lever 162 and is responsive to a cam 220 coupled to the shaft 218 to move the latch system 102 to the unlatched position. The latch system 102 is also in communication with an indicator lever 222 to communicate to the operator whether the front loader 12 is latched or unlatched based on the position of the latch system 102.

The latch body 210 is movable or pivotable about a pivot axis P defined by a central axis of a pivot pin 224. The pivot pin 224 has a first end 224a opposite a second end 224b. The pivot pin 224 is composed of a metal or metal alloy, and is formed by stamping, extrusion, casting, machining, etc. With brief reference to FIGS. 3 and 4, the first end 224a is coupled to the mounting bracket 100b (FIG. 4) and the second end 224b is coupled to the mounting bracket 100a. In one example, each of the first end 224a and the second end 224b include a retaining groove 226 defined about a circumference of the pivot pin 224 at the respective one of the first end 224a and the second end 224b. Each of the retaining grooves 226 receives a respective retaining ring 228 to couple the pivot pin 224 to the mounting brackets 100a, 100b. It should be noted that other techniques, such as welding, may be used to couple the pivot pin 224 to the mounting brackets 100a, 100b. The latch body 210 is movable about the pivot pin 224 to latch or unlatch the front loader 12 to the tractor 10 (FIG. 1).

Figure 7:
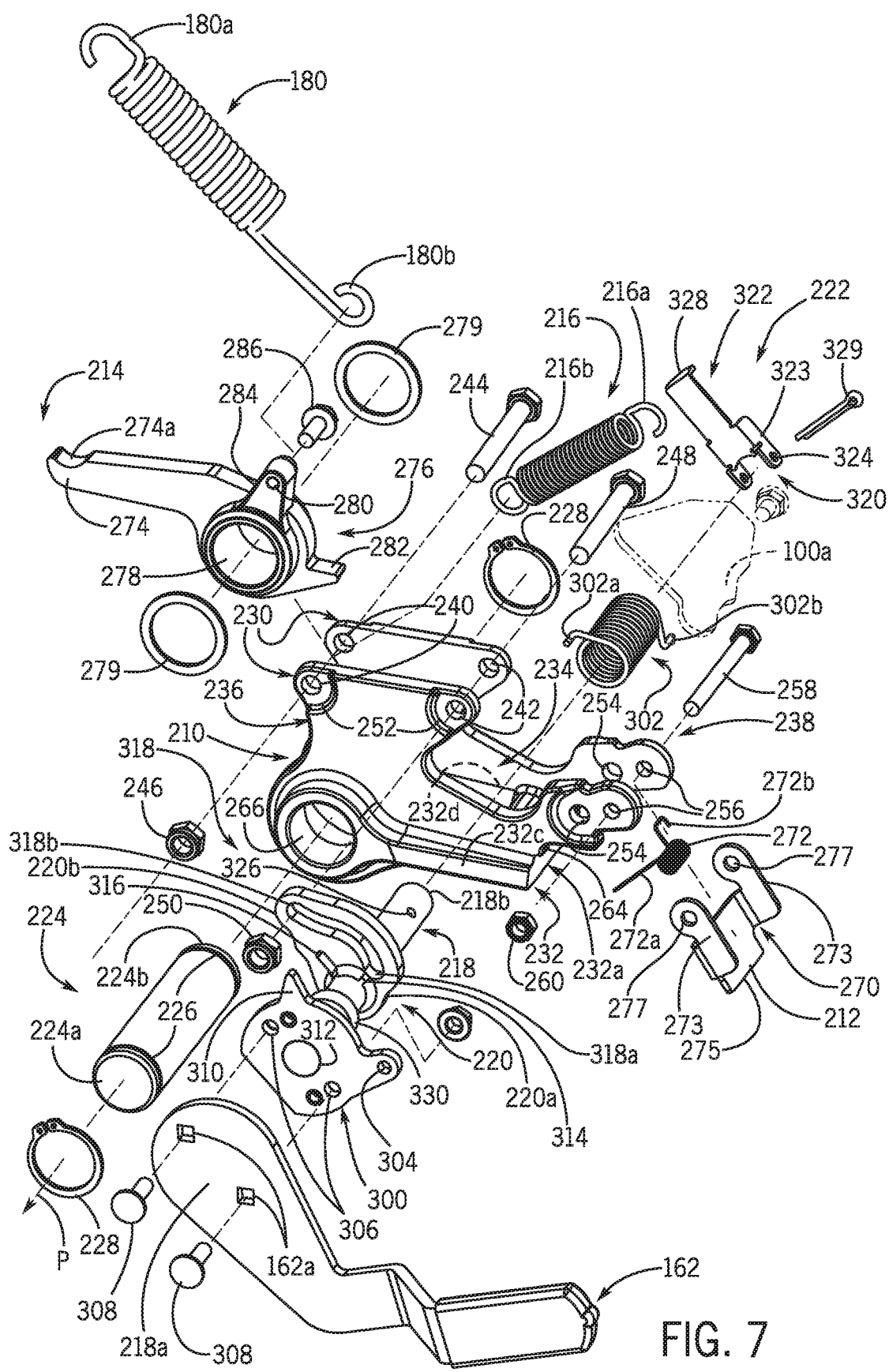
FIG. 7 is an exploded view of the latch system of FIG. 6.

With reference to FIG. 7, in one example, the latch body 210 is integrally or monolithically formed, and is composed of a metal or metal alloy. In other embodiments, the flanges 230 may be separately formed and coupled to the base 232, via welding, for example. The latch body 210 is composed of a metal or metal alloy, and may be formed by casting, forging, stamping, etc. The latch body 210 includes a pair of flanges 230 and a base 232. The pair of flanges 230 are coupled to the base 232 so as to define a recess 234 between the pair of flanges 230. As will be discussed, at least the latch positioning lever 214 is received within the recess 234. Each flange 230 of the pair of flanges 230 is substantially the same. Each flange 230 of the pair of flanges 230 defines a first pivoting arm end 236 and a second pivoting arm end 238. The first pivoting arm end 236 is shorter than the second pivoting arm end 238, and is arranged above the second pivoting arm end 238, offset at an angle of about 70 degrees (counterclockwise). The first pivoting arm end 236 forms a lever arm about the pivot axis P of the latch body 210, and the second pivoting arm end 238 forms a second lever arm about the pivot axis P of the latch body 210.

The first pivoting arm end 236 includes a first bore 240 and a second bore 242. The first bore 240 is spaced apart from the second bore 242. The first bore 240 of each of the flanges 230 cooperates to receive a first mechanical fastener 244. The first mechanical fastener 244, in one example, is a bolt, which is secured within the first bores 240 by a nut 246. The first mechanical fastener 244 receives a second spring end 216b of the second spring 216 to couple the second spring 216 to the latch body 210. The second bore 242 of each of the flanges 230 cooperates to receive a second mechanical fastener 248. The second mechanical fastener 248, in one example, is a bolt, which is secured within the second bores 242 by a nut 250. The second mechanical fastener 248 receives a portion of the cam 220 to couple the cam 220 to the latch body 210. Each of the first bore 240 and the second bore 242 may be defined with a relief 252, which substantially surrounds the respective one of the first bore 240 and the second bore 242 to enable the respective nut 246, 250 to be coupled to the respective one of the first mechanical fastener 244 and the second mechanical fastener 248.

The second pivoting arm end 238 defines a free end, which is coupled to the support hinge 212. In one example, the second pivoting arm end 238 includes a third bore 254 and a fourth bore 256. The third bore 254 is spaced apart from the fourth bore 256. The fourth bore 256 of each of the flanges 230 cooperates to receive a third mechanical fastener 258. The third mechanical fastener 258, in one example, is a bolt, which is secured within the fourth bores 256 by a nut 260. Generally, the third mechanical fastener 258 is secured by the nut 260 so as to be rotatable within the fourth bores 256 to enable a movement of the support hinge 212. The third mechanical fastener 258 receives couples the support hinge 212 to the latch body 210. In one example, a relief 262 is defined about the third bore 254 to enable the nut 260 to be coupled to the third mechanical fastener 258. Generally, the second pivoting arm end 238 projects outwardly over a first base end 232a of the base 232.

The base 232 is defined from the first base end 232a to an opposite second base end 232b (FIG. 5). The base 232 also includes a first base side 232c opposite a second base side 232d. The first base end 232a defines a latch surface 264. With brief reference to FIG. 9, the latch surface 264 is received within the mounting frame load point 188 and contacts the first surface 200 to latch or lock the mast 82 of the front loader 12 to the mounting frame 86 of the tractor 10. With reference back to FIG. 7, the base 232 includes a pivot bore 266 defined at the second base end 232b. The pivot bore 266 receives the pivot pin 224 to pivotally couple the latch body 210 to the mounting brackets 100 of the mast 82. One of the flanges 230 is coupled to the first base side 232c, and the other of the flanges 230 is coupled to the second base side 232d. The base 232 may also include a rib 268. The rib 268 extends outwardly from the base 232 in the recess 234 between the flanges 230 and provides reinforcement to the second pivoting arm end 238.

The support hinge 212 cooperates with the latch body 210 to lock or unlock the front loader 12 to the tractor 10 (FIG. 1). In one example, the support hinge 212 includes a hinge body 270, a third biasing member or third spring 272 and the third mechanical fastener 258. The hinge body 270 is composed of a metal or metal alloy, and is stamped, cast, machined, etc. The hinge body 270 is substantially rectangular and includes a pair of mounting flanges 273 and a lip 275. The mounting flanges 273 extend outwardly from opposed sides of the hinge body 270, and each define a flange bore 277 that receives the third mechanical fastener 258. The lip 275 contacts the interface surface 198 (FIG. 5) during a coupling of the front loader 12 to the tractor 10 (FIG. 1). Generally, as will be discussed, a force applied to the lip 275 causes the hinge body 270 to pivot against the third spring 272 and support the latch body 210 on the interface surface 198.

In this example, the third spring 272 is a torsion spring, which is composed of a metal or metal alloy. The third spring 272 pretensions the support hinge 212 toward the second pivoting arm end 238. The third spring 272 includes a first spring end 272a and a second spring end 272b. The first spring end 272a is extends into the recess 234 (FIG. 5). The second spring end 272b includes a hook, which is coupled about the other one of the flanges 230 between the third bore 254 and the fourth bore 256 (FIG. 6). The third spring 272 also defines a spring bore 272c from the first spring end 272a to the second spring end 272b, which enables the third mechanical fastener 258 to be positioned through and coupled to the third spring 272. The third spring 272 resists a rotation of the third mechanical fastener 258 to maintain the support hinge 212 in a first position, as shown in FIG. 6.

The latch positioning lever 214 is responsive to input from the mounting frame 86 to move the latch body 210 such that the indicator lever 222 and the unlatch lever 162 are positioned relative to a respective one of the first gauge 116 and the second gauge 120 (FIGS. 3 and 4) to indicate an accurate position of the latch system 102. The latch positioning lever 214 is composed of a metal, metal alloy or polymer, and is cast, forged, molded, etc. The latch positioning lever 214 includes a first lever end 274 and an opposite second lever end 276. The first lever end 274 projects outwardly from the second lever end 276 to define a lever. The first lever end 274 is received through the clearance slot 178 (FIG. 4) and is movable relative to the clearance slot 178 when a force is applied by the mounting frame 86 (FIG. 8). The first lever end 274 may include a concave recess 274a. The second lever end 276 includes a lever pivot bore 278, a spring retainer bore 280 and a latch body tab 282.

The lever pivot bore 278 is defined through the latch positioning lever 214 and is sized to receive the pivot pin 224. The lever pivot bore 278 receives the pivot pin 224 such that the latch positioning lever 214 is movable or pivotable about the pivot axis P. One or more washers 279 may be positioned about the lever pivot bore 278 on opposed sides of the lever pivot bore 278 to assist in coupling the latch positioning lever 214 to the pivot pin 224. Generally, the latch positioning lever 214 is coupled to the pivot pin 224 such that the latch positioning lever 214 is received within the recess 234. The spring retainer bore 280 is defined through a spring retainer tab 284, which extends outwardly from the second lever end 276. The spring retainer bore 280 receives a spring retainer 286, which couples the first spring 180 to the latch positioning lever 214. In one example, the spring retainer 286 is a mechanical fastener, such as a bolt or a pin, which is coupled to and at least partially received within the spring retainer bore 280. In this example, the spring retainer 286 is coupled to the spring retainer bore 280 such that a second spring end 180b of the first spring 180 is coupled or hooked about a portion of the spring retainer 286. The latch body tab 282 extends outwardly from the second lever end 276 and is coupled to the latch body 210. In one example, with reference to FIG. 5, the latch body tab 282 contacts a bottom surface 232e of the latch body 210. The contact between the latch body tab 282 and the latch body 210 enables the latch positioning lever 214 to move the latch body 210 when a force is imparted to the latch positioning lever 214 by the mounting frame 86, for example.

The first spring 180 is coupled between the latch positioning lever 214 and the reinforcing panel 124. The first spring 180 biases the latch positioning lever 214, and thus, the latch body 210, upward toward the reinforcing panel 124. In this example, the first spring 180 is an extension spring, which is composed of metal or metal alloy. The first spring end 180a is coupled to the reinforcing panel 124, and the opposite second spring end 180b is coupled to the spring retainer 286 of the latch positioning lever 214.

The second spring 216 is coupled to the first mechanical fastener 244 and to a second reinforcing panel 290. The second reinforcing panel 290 also interconnects the mounting brackets 100. The second reinforcing panel 290 extends through the channel 106 to interconnect the mounting bracket 100a and the mounting bracket 100b. The second reinforcing panel 290 is composed of a metal or a metal alloy, and is stamped, cast, forged, machined, etc. The second reinforcing panel 290 is coupled to the mounting brackets 100a, 100b via welding, however, any technique may be employed. In one example, the second reinforcing panel 290 includes a third panel end 292, a fourth panel end 294 opposite the third panel end 292 and a spring retaining slot 296. The third panel end 292 is coupled within the channel 106 proximate the first panel end 170 of the reinforcing panel 124. The fourth panel end 294 extends from the third panel end 292 toward the second mast connection member 105. The spring retaining slot 296 is defined through the second reinforcing panel 290 between the third panel end 292 and the fourth panel end 294. The spring retaining slot 296 is defined through the second reinforcing panel 290 so as to be adjacent to or near the third panel end 292. The spring retaining slot 296 receives and retains a first spring end 216a of the second spring 216 on the second reinforcing panel 290. The spring retaining slot 296 may include a bar, or other feature, which enables the first spring end 216a to be hooked about and securely coupled to the spring retaining slot 296. An opposite second spring end 216b of the second spring 216 is coupled to and retained by the first mechanical fastener 244. The second spring 216 biases the latch body 210 upward toward the second reinforcing panel 290. In this example, the second spring 216 is an extension spring, which is composed of metal or metal alloy. The first spring end 216a is coupled to the second reinforcing panel 290, and the opposite second spring end 216b is coupled to the first mechanical fastener 244, which is coupled to the latch body 210.

With reference to FIG. 7, the unlatch lever 162 enables an operator to unlatch the latch body 210, and thus, uncouple the front loader 12 from the tractor 10 (FIG. 1). The unlatch lever 162 is coupled to the shaft 218 to move in unison with the shaft 218. The shaft 218 has a first shaft end 218a and an opposite second shaft end 218b. The first shaft end 218a is coupled to the unlatch lever 162 and is positioned adjacent to and through a bore defined in the mounting bracket 100b (FIG. 3A). The shaft 218 extends from the first shaft end 218a through the mounting bracket 100b, a space defined between the first pivoting arm end 236 and the second pivoting arm end 238, through the mounting bracket 100a and to the second shaft end 218b. The second shaft end 218b is coupled to the indicator lever 222 and is positioned adjacent to and through the mounting bracket 100a (FIG. 4). In one example, the second shaft end 218b extends through the gauge bore 146 defined in the gauge body 140 and is movable relative to the gauge body 140. The shaft 218 is composed of a metal or metal alloy, and is cast, forged, machined, extruded, etc. The shaft 218 may be integrally formed with, welded or otherwise coupled to the unlatch lever 162. In this example, a retaining and indicator plate 300 couples the unlatch lever 162 to the shaft 218. The cam 220, a fourth biasing member or fourth spring 302 and the indicator lever 222 are each coupled to the shaft 218.

The retaining and indicator plate 300 defines a bore 304, which receives the lock pin 157 to secure the unlatch lever 162 to prevent accidental unlatching of the front loader 12 when the front loader 12 is latched to the tractor 10 (FIG. 1). The retaining and indicator plate 300 is composed of metal or metal alloy, and may be cast, stamped, molded, etc. The retaining and indicator plate 300 also includes an indicator arrow 310, a pair of bores 306 and a central bore 312. The indicator arrow 310 cooperates with the first gauge 116 to point to the respective one of the first indicator symbol 142 or the second indicator symbol 144 based on the position of the unlatch lever 162. Thus, the retaining and indicator plate 300 is generally coupled to the shaft 218 and the unlatch lever 162 such that the indicator arrow 310 is aligned with the second indicator symbol 144 when the unlatch lever 162 has moved the latch body 210 to the unlatched position (FIG. 3A) and such that the indicator arrow 310 is aligned with the first indicator symbol 142 when the unlatch lever 162 has moved the latch body 210 to the latched position (FIG. 3B). The central bore 312 is coupled to the shaft 218. The central bore 312 is generally coupled to the shaft 218 via welding; however, any suitable technique may be employed. The central bore 312 couples the retaining and indicator plate 300 to the shaft 218 to move with the shaft 218, and the pair of bores 306 couple the unlatch lever 162 to the retaining and indicator plate 300 such that the shaft 218 moves based on a movement of the unlatch lever 162 and vice versa. In one example, the unlatch lever 162 includes a pair of bores 162a defined through an end portion of the unlatch lever 162 that are coaxially aligned with the pair of bores 306 of the retaining and indicator plate 300 to couple the unlatch lever 162 to the retaining and indicator plate 300. In one example, a pair of mechanical fasteners 308, such as bolts and nuts, couple the unlatch lever 162 to the retaining and indicator plate 300, which is coupled to the shaft 218. It should be understood, however, that the retaining and indicator plate 300 may be coupled to the unlatch lever 162 via any suitable technique. The unlatch lever 162 also includes a graspable portion or handle, opposite the end portion, which enables the operator to move or rotate the unlatch lever 162. The handle may include a polymer-based coating, such as a rubber, which is overmolded over the handle to provide comfort to the operator.

The cam 220 is disposed on the shaft 218 between the retaining and indicator plate 300 and the fourth spring 302. Generally, the cam 220 is coupled to the shaft 218 so as to be positioned within the recess 234 defined by the latch body 210 (FIG. 6). The cam 220 is composed of metal or metal alloy, and may be cast, stamped, molded, etc. The cam 220 includes a cam bore 314, a spring retaining slot 316 and a guide channel 318. The cam bore 314 is circular, and is sized to receive the shaft 218. In one example, the cam 220 is welded to the shaft 218 at or about the cam bore 314; however, the cam 220 may be coupled to the shaft 218 via any suitable technique. The cam bore 314 is defined at a first cam end 220a. The spring retaining slot 316 is defined adjacent to the cam bore 314 and extends radially outward from the cam bore 314. The spring retaining slot 316 is sized to retain a first spring end 302a of the fourth spring 302. The spring retaining slot 316 is spaced apart from the guide channel 318. The guide channel 318 is defined through the cam 220 from the first cam end 220a to an opposite second cam end 220b. The guide channel 318 directs a motion of the latch body 210 based on a rotation of the shaft 218. The second mechanical fastener 248 is received within the guide channel 318 and couples the latch body 210 to the cam 220. The second mechanical fastener 248 follows a path defined by the guide channel 318 to move the latch body 210 and the unlatch lever 162 between the latched position and unlatched position. In one example, the guide channel 318 defines a curved path, with a first channel end 318a at the first cam end 220a, and a second channel end 318b at the second cam end 220b. The first channel end 318a substantially defines latch position for the latch body 210 and the unlatch lever 162 (FIG. 5), in which the front loader 12 is latched to the tractor 10 (FIG. 1), and the second channel end 318b defines the unlatch position for the latch body 210 and the unlatch lever 162 (FIG. 9), in which the front loader 12 is unlatched from the tractor 10 (FIG. 2).

The fourth spring 302 is coupled to the cam 220 and to the mounting bracket 100a. The fourth spring 302 is a torsion spring, and is composed of metal or metal alloy. The fourth spring 302 includes the first spring end 302a, which is received within and coupled to the spring retaining slot 316 of the cam 220. The fourth spring 302 also includes a second spring end 302b, opposite the first spring end 302a, which is coupled to the mounting bracket 100a. The fourth spring 302 resists a motion of the unlatch lever 162 from the latched position toward the unlatch position. The fourth spring 302 also defines a spring bore 302c from the first spring end 302a to the second spring end 302b, which enables the shaft 218 to be positioned through the fourth spring 302.

The indicator lever 222 is coupled to the shaft 218 and is in communication with the second gauge 120 (FIG. 4). The indicator lever 222 includes a first lever end 320 and an opposite second lever end 322. The first lever end 320 includes a pair of flanges 323. In this example, each flange 323 includes a bore 324 that cooperates with a bore 326 defined in the shaft 218 near the second shaft end 218b to couple the indicator lever 222 to the shaft 218 with a mechanical fastener 329. In one example, the mechanical fastener 329 is a cotter pin; however, any suitable mechanical fastener may be used. Generally, the indicator lever 222 is coupled to the shaft 218 so as to be positioned external to the mounting bracket 100b. The second lever end 322 includes an arrow 328. The arrow 328 is positionable over the first gauge surface 150 and the second gauge surface 152 based on the position of the shaft 218 to indicate a position of the latch system 102 (FIG. 4). The pair of flanges 323 and the arrow 328 extend outwardly from a body of the indicator lever 222 to enable the gauge body 140 to be positioned over the indicator lever 222 while enabling a movement of the indicator lever 222 relative to the gauge body 140.

In certain instances, a collar 330 may be disposed about the shaft 218 to assist in guiding a movement of the shaft 218 relative to the latch body 210. In one example, the collar 330 is annular, and is positioned about the shaft 218 between the cam 220 and the retaining and indicator plate 300. In this example, the collar 330 contacts a surface of one of the flanges 230 and rotates relative to the surface of the flange 230 to guide a motion of the shaft 218.

Generally, in one example, with the mounting brackets 100a, 100b formed, the reinforcing panel 124 and the second reinforcing panel 290 are coupled to the mounting 100b. One of the opposed ends of the first mast connection member 104 is coupled to the mounting brackets 100b, and one of the opposed ends of the second mast connection member 105 is coupled to the mounting brackets 100b. With the latch body 210 formed and the hinge body 270 formed, the hinge body 270 is coupled to the latch body 210 with the third mechanical fastener 258 such that the third spring 272 is positioned about the third mechanical fastener 258 between the mounting flanges 273. The second spring end 272b is positioned about the one of the flanges 230. With the latch positioning lever 214 formed, the second spring end 180b is positioned adjacent to the spring retainer tab 284 and the spring retainer 286 is coupled to the spring retainer bore 280 to couple the first spring 180 to the latch positioning lever 214. The first mechanical fastener 244 is positioned through one of the first bores 240 of one of the flanges 230 and the second spring end 216b. The first mechanical fastener 244 is positioned through the other of the first bores 240 and coupled to the latch body 210 with the nut 246 to couple the second spring 216 to the latch body 210.

The latch body 210 is positioned adjacent to the mounting bracket 100b, and the latch positioning lever 214 is coupled to the latch body 210 such that the latch body tab 282 contacts the bottom surface 232e of the base 232 of the latch body 210. The pivot pin 224 is inserted through the pivot bore 266 and the lever pivot bore 278 to pivotally couple the latch positioning lever 214 to the latch body 210 and to pivotally couple the latch body 210 to the mounting bracket 100b. One of the washers 279 is positioned over the first end 224a of the pivot pin 224, and one of the retaining rings 228 is coupled to the pivot pin 224 to couple the pivot pin 224 to the mounting bracket 100b. The latch positioning lever 214 is coupled to the mounting bracket 100b such that the first lever end 274 extends through the clearance slot 178 (FIG. 4). With the retaining and indicator plate 300 formed, the retaining and indicator plate 300 is coupled to the first shaft end 218a of the shaft 218 and the collar 330 is coupled about the shaft 218 adjacent to the retaining and indicator plate 300. With the cam 220 formed, the cam 220 is coupled to the shaft 218. The shaft 218 is positioned through the bore defined in the mounting bracket 100b, and the second mechanical fastener 248 is coupled to the latch body 210 so as to extend through and be in communication with the guide channel 318 of the cam 220. The fourth spring 302 is coupled about the shaft 218, and the first spring end 302a is received within the spring retaining slot 316.

The mounting bracket 100a is positioned adjacent to the mounting bracket 100b and the second end 224b of the pivot pin 224 is received through the mounting bracket 100a. The other one of the washers 279 is positioned over the second end 224b of the pivot pin 224, and the other one of the retaining rings 228 is coupled to the pivot pin 224 to couple the pivot pin 224 to the mounting bracket 100a. The other opposed end of the first mast connection member 104 is coupled to the mounting bracket 100a and the other opposed end of the second mast connection member 105 is coupled to the mounting bracket 100a. The mounting bracket 100a is also coupled to the reinforcing panel 124 and the second reinforcing panel 290 such that the mounting brackets 100 are coupled together to define the channel 106 (FIG. 2A). The first spring end 180a of the first spring 180 is coupled to the reinforcing panel 124, and the first spring end 216a of the second spring 216 is coupled to the second reinforcing panel 290. This is repeated to form both masts 82 for the front loader 12.

With the masts 82 formed and the remainder of the front loader 12 assembled, with reference to FIG. 1, in one example, the masts 82 are coupled to the respective one of the loader arms 62, 64 via a respective one of the pins 134. Each one of the pins 134 is inserted into the second pin coupling bore 112 of the pair of mounting brackets 100 and the end of the respective one of the loader arms 62, 64. Each of the reinforcing arms 67 is coupled to each one of the masts 82 via a respective one of the pins 136. Each one of the pins 136 is inserted into the first pin coupling bore 110 of the pair of mounting brackets 100 and the end of the respective one of the reinforcing arms 67. Each of the hydraulic cylinders 34 is coupled to a respective one of the mounting brackets 100 via the coupling pin 84. Generally, each one of the coupling pins 84 is inserted into the third pin coupling bore 114 of the mounting brackets 100 and the end of the respective one of the hydraulic cylinders 34.

With the masts 82 coupled to the front loader 12, the front loader 12 may be coupled to the tractor 10. With reference to FIG. 2, with the front loader 12 resting on the parking stands 65, the tractor 10 is advanced toward the front loader 12. With reference to FIG. 5, the tractor 10 is advanced such that the mounting frame 86 is in proximity to the mast 82.

As the tractor 10 is advanced toward the front loader 12, with reference to FIG. 8, the mounting frame 86 enters into the channel 106 defined between the mounting brackets 100. In one example, the interface surface 164 of the mounting frame 86 contacts the first mast connection member 104, which slides along the interface surface 198 as the tractor 10 advances toward the front loader 12 (FIG. 2). As the mounting frame 86 of the tractor 10 advances toward the mast 82, the first mounting frame connection point 184 contacts the first lever end 274 of the latch positioning lever 214. The contact between the first mounting frame connection point 184 and the latch positioning lever 214 causes the latch positioning lever 214 to pivot about the pivot axis P while the first spring 180 continues to apply a spring force Fs1 in a direction toward the reinforcing panel 124. The lip 275 of the support hinge 212 contacts the mounting frame 86. The second spring 216 applies a second spring force Fs2 in a direction toward the second reinforcing panel 290. The contact between the first mounting frame connection point 184 and the latch positioning lever 214 causes the second mechanical fastener 248 to move from the second channel end 318b (unlatched position) toward the first channel end 318a (latched position).

With reference to FIG. 9, the further advancement of the tractor 10 couples or hooks the first mast connection member 104 within the first mounting frame connection point 184. The coupling of the first mast connection member 104 to the first mounting frame connection point 184 causes the first mounting frame connection point 184 to slide along a contact surface 274b of the first lever end 274 of the latch positioning lever 214 and further rotates the latch positioning lever 214 until the concave recess 274a contacts the third panel end 292 of the second reinforcing panel 290. The further rotation of the latch positioning lever 214 causes the rotation of the latch body 210, which in turn, causes the second mechanical fastener 248 to move along the guide channel 318 to the first channel end 318a. In addition, the continued application of force to the lip 275 causes the latch body 210 to pivot until the latch surface 264 engages with the mounting frame load point 188. Once the latch surface 264 is engaged with the mounting frame load point 188, the support hinge 212 rests on the mounting frame 86. When the second mechanical fastener 248 approaches the first channel end 318a, the second mechanical fastener 248 overtravels to the first channel end 318a and rests within the guide channel 318 proximate the first channel end 318a when the latch surface 264 is received within the mounting frame load point 188. The movement of the second mechanical fastener 248 within the guide channel 318 causes the shaft 218 coupled to the cam 220, the retaining and indicator plate 300 and the unlatch lever 162 to move or pivot the retaining and indicator plate 300 and the unlatch lever 162 such that the indicator arrow 310 is aligned with the fourth gauge surface 160 of the second gauge 120 to visually indicate that the front loader 12 is latched to the tractor 10 (FIG. 3B). As the indicator lever 222 is coupled to the shaft 218, the movement of the shaft 218 by the movement of the second mechanical fastener 248 along the guide channel 318 of the cam 220 also causes the indicator lever 222 to pivot such that the arrow 328 is aligned with the second gauge surface 152 of the first gauge 116. With the latch surface 264 received within the mounting frame load point 188, the front loader 12 is latched or locked to the mounting frame 86 of the tractor 10. The operator may insert the lock pin 157 into the bore 304 of the retaining and indicator plate 300 and the lock pin bore 156 of the second gauge 120 to retain the unlatch lever 162 in the latched position.

In order to disconnect the front loader 12 from the tractor 10, in one example, the operator may disconnect the hydraulic cylinders 34, 36, 38 from the hydraulic circuit of the tractor 10. The parking stands 65 may be positioned to support the front loader 12 on a ground surface. The operator may remove the lock pin 157 and move or rotate the unlatch lever 162 from the latched position to the unlatched position. The movement of the unlatch lever 162 moves or pivots the retaining and indicator plate 300 such that the indicator arrow 310 is aligned with the third gauge surface 158 of the second gauge 120 to visually indicate that the front loader 12 is unlatched from the tractor 10 (FIG. 3B). As the indicator lever 222 is coupled to the shaft 218, the movement of the shaft 218 by the unlatch lever 162 causes the indicator lever 222 to pivot such that the arrow 328 is aligned with the first gauge surface 150 of the first gauge 116. The movement of the unlatch lever 162 causes the second mechanical fastener 248 to move from proximate the first channel end 318a to the second channel end 318b. The movement of the second mechanical fastener 248 within the guide channel 318 causes the latch body 210 to pivot such that the lip 275 of the support hinge 212 contacts the interface surface 198 of the mounting frame 86. The first spring 180 returns the latch positioning lever 214 to the unlatched position, and cooperates with the second spring 216 to move the latch body 210 to remove the latch surface 264 from the mounting frame load point 188. The removal of the latch surface 264 from the mounting frame load point 188 uncouples or unlatches the front loader 12 from the tractor 10. Once the operator returns to the cab 28, the operator may retract or move the tractor 10 away from the front loader 12.

Also, the following examples are provided, which are numbered for easier reference:

1. A front loader comprising: a mast; a mounting bracket that defines a channel configured to receive a mounting frame of a work vehicle; a latch disposed within the channel and pivotally coupled to the mounting bracket, the latch pivotable between a first, latched position configured to couple the mast to the mounting frame, and a second, unlatched position; a latching lever disposed within the channel and coupled to the latch, the latching lever configured to move the latch between the first, latched position and the second, unlatched position based on a position of the mounting frame; and an indicator lever coupled to the latch, wherein the indicator lever is movable by the latch to indicate whether the latch is in the first, latched position or the second, unlatched position.

2. The front loader of example 1, wherein the latch includes a shaft that extends through the latch and the indicator lever is coupled to the shaft to move with the shaft.

3. The front loader of example 2, wherein the latch includes an unlatch lever to move the latch from the first, latched position to the second, unlatched position, the unlatch lever is coupled to a first end of the shaft, and the indicator lever is coupled to a second end of the shaft.

4. The front loader of example 3, wherein the latch includes a cam coupled to the shaft, and a movement of the unlatch lever to move the latch from the first, latched position to the second, unlatched position causes a portion of the latch to move within the cam to pivot the latch into the second, unlatched position.

5. The front loader of example 3, wherein the mast includes a pair of linkages and the mounting bracket further comprises a second mounting bracket that forms a pair of mounting brackets configured to couple the pair of linkages to the mounting frame.

6. The front loader of example 5, further comprising a first gauge coupled to one mounting bracket of the pair of mounting brackets and a second gauge coupled to the other mounting bracket of the pair of mounting brackets, the indicator lever cooperates with the first gauge to indicate whether the latch is in the first, latched position or second, unlatched position and the unlatch lever is coupled to an indicator arrow that cooperates with the second gauge to indicate whether the latch is in the first, latched position or second, unlatched position.

7. The front loader of example 5, further comprising a reinforcing plate coupled between the pair of mounting brackets within the channel and a first biasing member that is coupled to the latching lever and to the reinforcing plate, wherein the first biasing member biases the latching lever toward the reinforcing plate.

8. The front loader of example 1, wherein the latch further comprises a latch body having a latch surface that engages the mounting frame in the first, latched position and the latching lever includes a tab that contacts a surface of the latch body to couple the latching lever to the latch body.

9. A work vehicle having the mounting frame for coupling to the mast of the front loader of example 1.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A front loader comprising:
   a mast;
   a mounting bracket that defines a channel configured to receive a mounting frame of a work vehicle;
   a latch disposed within the channel and pivotally coupled to the mounting bracket, the latch pivotable between an unlatched position and a latched position configured to couple the mast to the mounting frame;
   a latch positioning lever disposed within the channel and coupled to the latch, the latch positioning lever configured to move the latch between the latched position and the unlatched position;
   an indicator lever coupled to and movable by the latch;
   an unlatch lever configured to move the latch from the latched position to the unlatched position; and
   a first gauge and a second gauge each at a different side of the mast;
   wherein the first gauge is configured to indicate whether the latch is in the latched position or the unlatched position based on a position of the indicator lever; and
   wherein the second gauge is configured to indicate whether the latch is in the latched position or the unlatched position based on a position of the unlatch lever.

2. The front loader of claim 1, wherein the latch includes a shaft that extends through the latch and the indicator lever is coupled to the shaft to move with the shaft.

3. The front loader of claim 2, wherein the unlatch lever is coupled to a first end of the shaft, and the indicator lever is coupled to a second end of the shaft.

4. The front loader of claim 3, wherein the latch includes a cam coupled to the shaft, and a movement of the unlatch lever to move the latch from the latched position to the unlatched position causes a portion of the latch to move within the cam to pivot the latch into the second, unlatched position.

5. The front loader of claim 3, wherein the mast includes a pair of linkages and the mounting bracket further comprises a second mounting bracket that forms a pair of mounting brackets configured to couple the pair of linkages to the mounting frame; and
   wherein the first gauge is coupled to one mounting bracket of the pair of mounting brackets and the second gauge is coupled to the other mounting bracket of the pair of mounting brackets.

6. The front loader of claim 5, further comprising a reinforcing plate coupled between the pair of mounting brackets within the channel and a first biasing member that is coupled to the latch positioning lever and to the reinforcing plate, wherein the first biasing member biases the latch positioning lever toward the reinforcing plate.

7. The front loader of claim 1, wherein the unlatch lever is coupled to an indicator arrow that cooperates with the second gauge to indicate whether the latch is in the latched position or the unlatched position.

8. The front loader of claim 1, wherein the latch further comprises a latch body having a latch surface that engages the mounting frame in the latched position and the latch positioning lever includes a tab that contacts a surface of the latch body to couple the latch positioning lever to the latch body.

9. A work vehicle having a mounting frame for coupling to a mast of a front loader, the mast comprising:
   a pair of mounting brackets that cooperate to define a channel configured to receive the mounting frame;
   a first gauge and a second gauge each mounted to one mounting bracket of the pair of mounting brackets;
   a latch disposed within the channel and pivotally coupled to the pair of mounting brackets, the latch pivotable between an unlatched position and a latched position configured to couple the mast to the mounting frame;
   a latch positioning lever disposed within the channel and coupled to the latch, the latch positioning lever configured to move the latch between the latched position and the unlatched position;
   an indicator lever coupled to and movable by the latch; and
   an unlatch lever coupled to an indicator arrow and configured to move the latch from the latched position to the unlatched position; and wherein the first gauge cooperates with the indicator lever to indicate whether the latch is in the latched position or the unlatched position; and wherein the second gauge cooperates with the indicator arrow to indicate whether the latch is in the latched position or the unlatched position.

10. The work vehicle of claim 9, wherein the latch includes a shaft that extends through the latch and the indicator lever is coupled to the shaft to move with the shaft.

11. The work vehicle of claim 10, wherein the unlatch lever is coupled to a first end of the shaft, and the indicator lever is coupled to a second end of the shaft.

12. The work vehicle of claim 11, wherein the latch includes a cam coupled to the shaft, and a movement of the unlatch lever to move the latch from the latched position to the unlatched position causes a portion of the latch to move within the cam to pivot the latch into the unlatched position.

13. The work vehicle of claim 9, further comprising a reinforcing plate coupled between the pair of mounting brackets within the channel and a first biasing member that is coupled to the latch positioning lever and to the reinforcing plate, wherein the first biasing member biases the latch positioning lever toward the reinforcing plate.

14. The work vehicle of claim 9, wherein the latch further comprises a latch body having a latch surface that engages the mounting frame in the latched position and the latch positioning lever includes a tab that contacts a surface of the latch body to couple the latch positioning lever to the latch body.

15. A work vehicle, comprising:
a mounting frame having a connection point;
a removable front loader having a mast; and
a latching arrangement, including:
a pair of mounting brackets that cooperate to define a channel configured to receive the mounting frame;
a mast connection member coupled between the pair of mounting brackets that is configured to couple to the connection point;
a latch disposed within the channel and pivotally coupled to the pair of mounting brackets, the latch pivotable between an unlatched position and a latched position configured to couple the mast to the mounting frame;
a latch positioning lever disposed within the channel and coupled to the latch, the latch positioning lever configured to move the latch between the latched position and the unlatched position; and
an indicator lever coupled to and movable by the latch;
an unlatch lever coupled to an indicator arrow and configured to move the latch from the latched position to the unlatched position; and
a first gauge and a second gauge each mounted to one mounting bracket of the pair of mounting brackets;
wherein the first gauge cooperates with the indicator lever to indicate whether the latch is in the latched position or the unlatched position; and
wherein the second gauge cooperates with the indicator arrow to indicate whether the latch is in the latched position or the unlatched position.

16. The work vehicle of claim 15, wherein the latch includes a shaft having a first end and a second end, and the unlatch lever is coupled to the first end of the shaft to move the latch from the latched position to the unlatched position, the shaft extends through the latch and the indicator lever is coupled to the second end of the shaft to move with the shaft.

17. The work vehicle of claim 16, wherein the latch includes a cam coupled to the shaft, and a movement of the unlatch lever to move the latch from the latched position to the unlatched position causes a portion of the latch to move within the cam to pivot the latch into the unlatched position.

18. The work vehicle of claim 15, further comprising a reinforcing plate coupled between the pair of mounting brackets within the channel and a first biasing member that is coupled to the latch positioning lever and to the reinforcing plate, wherein the first biasing member biases the latch positioning lever toward the reinforcing plate.

* * * * *